US008824445B1

(12) United States Patent
Berenberg et al.

(10) Patent No.: US 8,824,445 B1
(45) Date of Patent: Sep. 2, 2014

(54) NULL INTERFACE FEATURE IN WIRELESS MESH NETWORKING DEVICE

(71) Applicant: Cubic Corporation, San Diego, CA (US)

(72) Inventors: Paul Berenberg, Los Altos, CA (US); Mike Baumgartner, Panama City, FL (US); Igor Ryshakov, Mountain View, CA (US); Anatoli Gostev, Cupertino, CA (US)

(73) Assignee: Cubic Corporation, San Diego, CA (US)

( * ) Notice: Subject to any disclaimer, the term of this patent is extended or adjusted under 35 U.S.C. 154(b) by 0 days.

(21) Appl. No.: 14/158,015

(22) Filed: Jan. 17, 2014

Related U.S. Application Data

(63) Continuation of application No. 14/151,737, filed on Jan. 9, 2014.

(60) Provisional application No. 61/814,098, filed on Apr. 19, 2013.

(51) Int. Cl.
H04Q 7/24 (2006.01)
H04W 76/02 (2009.01)

(52) U.S. Cl.
CPC ..................... *H04W 76/02* (2013.01)
USPC ............ 370/338; 370/401; 370/251; 370/254

(58) Field of Classification Search
USPC .................. 370/401, 338, 252, 254
See application file for complete search history.

(56) References Cited

U.S. PATENT DOCUMENTS

| 7,835,301 | B1 | 11/2010 | Maufer |
| 8,416,726 | B2 | 4/2013 | Berenberg |
| 8,498,224 | B2* | 7/2013 | Thubert et al. ................. 370/254 |
| 2006/0077985 | A1* | 4/2006 | Erwin et al. .................. 370/400 |
| 2006/0088013 | A1 | 4/2006 | Ganesh |
| 2006/0114881 | A1* | 6/2006 | Chari et al. ................... 370/351 |

(Continued)

FOREIGN PATENT DOCUMENTS

WO 2014/070866 A1 5/2014

OTHER PUBLICATIONS

First Action Interview Pilot Program Pre-Interview Communication issued Apr. 24, 2014, in U.S. Appl. No. 14/151,737.

(Continued)

*Primary Examiner* — Duc C Ho
(74) *Attorney, Agent, or Firm* — Kilpatrick Townsend & Stockton LLP

(57) ABSTRACT

This disclosure describes processes and methods for enhancing reporting of status information in a wireless sensor network. This disclosure also provides designs of wireless sensor devices configured to connect to a wireless network, and to execute the processes disclosed herein. As described herein, a first sensor device transmits a beacon signal to a second wireless device, and the beacon signal is transmitted while the first and second wireless devices are disconnected from the sensor network. The first wireless device facilitates supplemental network formation by transmitting information to the second wireless device, wherein the information causes the second wireless device to form the supplemental network by performing network joining procedures with the first wireless sensor device, and wherein, after performing network joining procedures, the second wireless device transmits status information to the first wireless sensor device. The first wireless device then connects to the wireless network and transmits the status information through the network.

20 Claims, 15 Drawing Sheets

(56) References Cited

U.S. PATENT DOCUMENTS

| | | | |
|---|---|---|---|
| 2006/0120370 A1* | 6/2006 | Ginchereau et al. | 370/392 |
| 2007/0189247 A1* | 8/2007 | Wang et al. | 370/338 |
| 2007/0206521 A1* | 9/2007 | Osaje | 370/315 |
| 2009/0138617 A1* | 5/2009 | Veillette | 709/238 |
| 2011/0280156 A1* | 11/2011 | Jing et al. | 370/254 |
| 2013/0094538 A1 | 4/2013 | Wang | |
| 2013/0136033 A1 | 5/2013 | Patil et al. | |

OTHER PUBLICATIONS

International Search Report issued Jun. 27, 2014 in PCT Application No. PCT/US2014/017507.

Notice of Allowance issued Jul. 8, 2014 in U.S. Appl. No. 14/151,737.

Zhao, W. et al., "A message ferrying approach for data delivery in sparse mobile ad hoc networks," Proceedings of the 5$^{th}$ ACM International Symposium on Mobile Ad Hoc Networking and Computing (MOBIHOC), May 24, 2004, pp. 187-198.

Modani, Kiran, "Adaptivity of arod routing protocol in sparse and dense ad-hoc networks," IEEE Conference on Computational Intelligence and Communication Networks (CICN), Oct. 7, 2011, pp. 107-112.

Jain, S. et al., "Routing in a delay tolerant network," ACM Computer Communication Review, Oct. 2004, vol. 34, No. 4, pp. 145-157.

* cited by examiner

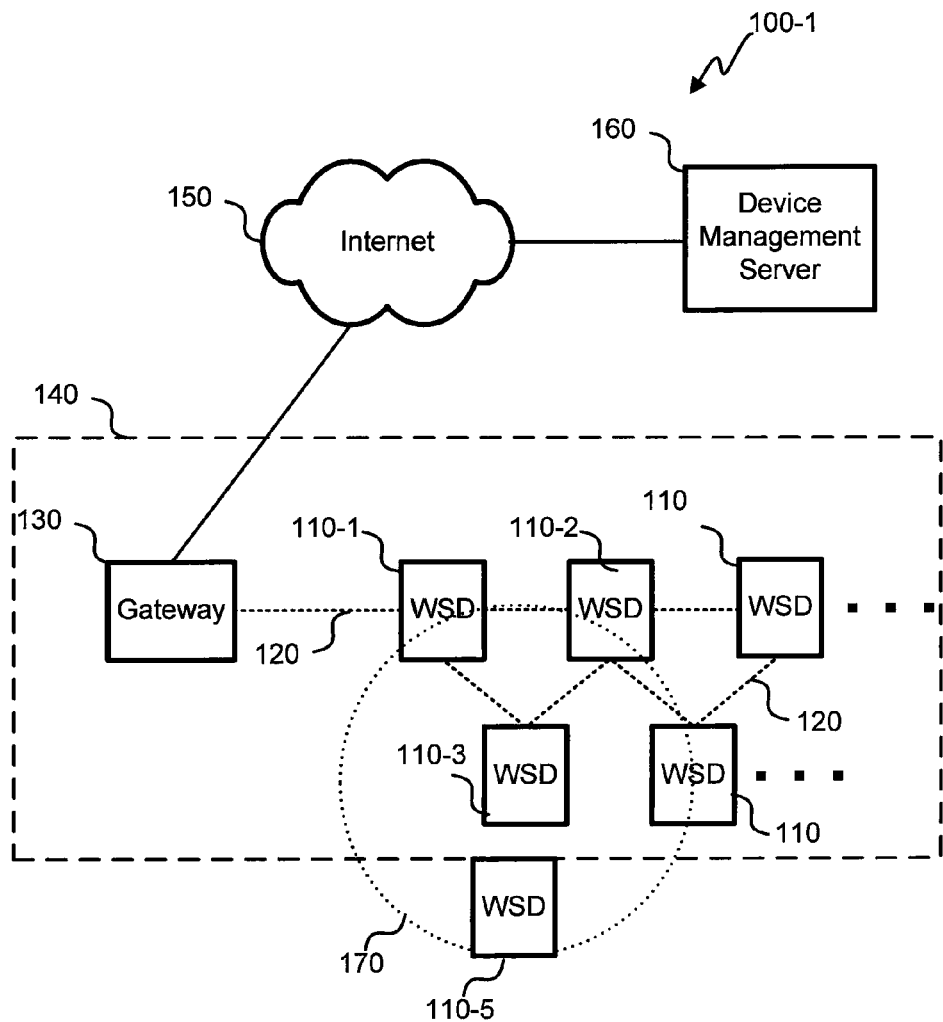
FIG. 1B
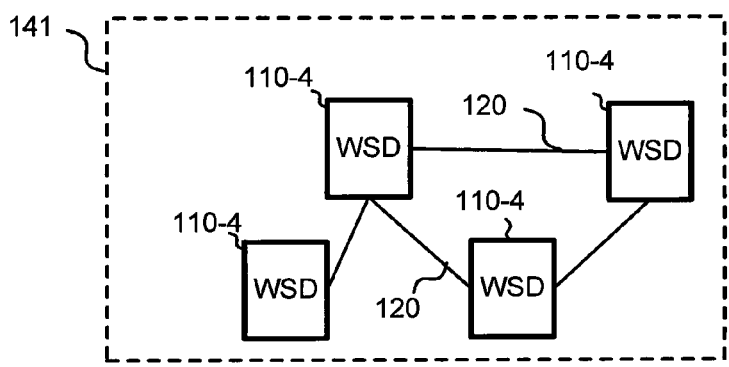

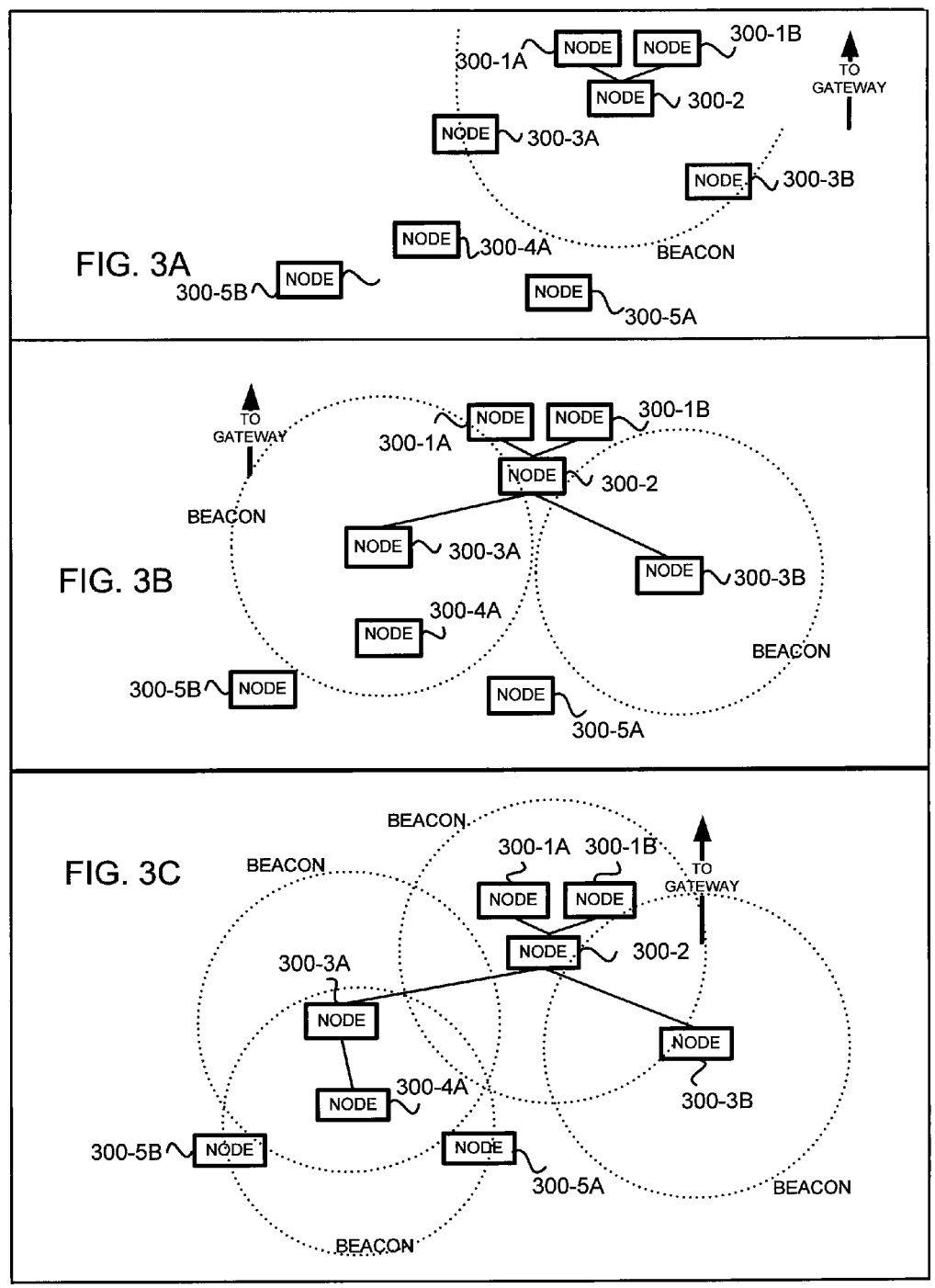

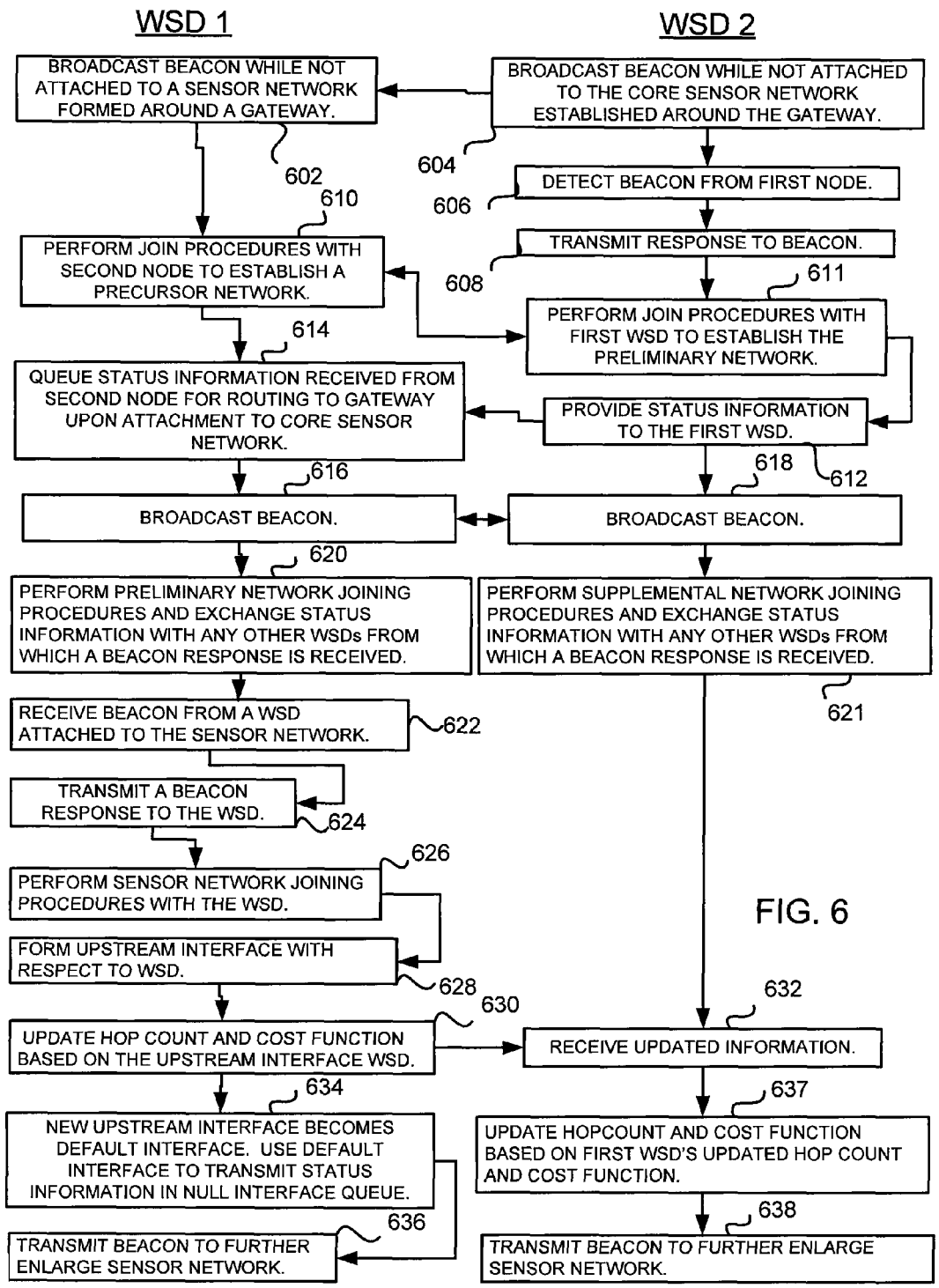

NULL INTERFACE FEATURE IN WIRELESS MESH NETWORKING DEVICE

This application is a continuation of U.S. patent application Ser. No. 14/151,737, filed Jan. 9, 2014, which is entitled "Null Interface Feature In Wireless Mesh Networking Device", and which is a non-provisional of U.S. Provisional Patent Application No. 61/814,098, filed Apr. 19, 2013, and entitled "Null Interface Feature In Wireless Mesh Networking Device". Both U.S. patent application Ser. No. 14/151,737 and U.S. Provisional Patent Application No. 61/814,098 are incorporated herein by reference, in their entirety, and for all purposes.

BACKGROUND OF THE INVENTION

Modern networks can comprise a variety of devices, which may be connected in a numerous ways. A network can be, for example, centralized or ad hoc. In the latter case, each networked device, or node, can act as a router to forward data from other nodes, in addition to communicating its own data.

These wireless networks, however, have their limitations. For example, certain networks may use a highly decentralized topography dictated by the locations and movement of the nodes which the network is designed to connect. The coverage and reliability of these networks may be heavily affected by the time required to discover new nodes and join them to the network, as well as the time needed to rejoin previously-connected nodes to the network when a network link fails or is extinguished by the departure of a node. Moreover, certain techniques and methods for discovering nodes and joining them to the network may promote network scalability for certain topologies much more than for others.

BRIEF SUMMARY OF THE INVENTION

Techniques are disclosed for enabling enhanced reporting of status information in a wireless sensor network. One such technique involves a first wireless sensor device transmitting a beacon signal to a second wireless sensor device, wherein the beacon signal is transmitted while the first and second wireless sensor devices are disconnected from the sensor network, facilitating supplemental network formation by transmitting information to the second wireless sensor device, wherein the information causes the second wireless sensor device to form the supplemental network by performing network joining procedures with the first wireless sensor device, and wherein, after performing network joining procedures, the second wireless sensor device transmits status information to the first wireless sensor device, receiving the status information from the second wireless sensor device, queuing the status information, connecting to the wireless sensor network subsequent to queuing the status information, and transmitting the status information to a gateway of the wireless sensor network.

This disclosure also describes an apparatus configured to connect to a wireless network, the apparatus comprising an antenna for transmitting a beacon signal to a wireless device while the apparatus and wireless device are disconnected from the wireless network, a processor configured to facilitate supplemental network formation by causing information to be transmitted to the wireless device, wherein the information causes the wireless device to form the supplemental network by performing network joining procedures with the apparatus, and wherein, after performing network joining procedures, the wireless device transmits status information to the apparatus, a receiving mechanism configured to receive the status information from the wireless device, a memory queue configured to store the status information, wherein the processor is further configured to connect the apparatus to the wireless network and to cause status information received by the receiving mechanism to be transmitted to a gateway of the wireless network.

BRIEF DESCRIPTION OF THE DRAWINGS

FIG. 1B is a block diagram of another embodiment of a logistical management system incorporating a sensor network and preliminary network.

FIGS. 3A, 3B, 3C and 3D depict a method for expanding a network.

FIG. 6 is a swim lane diagram illustrating certain of the methods, techniques and processes disclosed herein.

DETAILED DESCRIPTION OF THE INVENTION

Figure 1A:
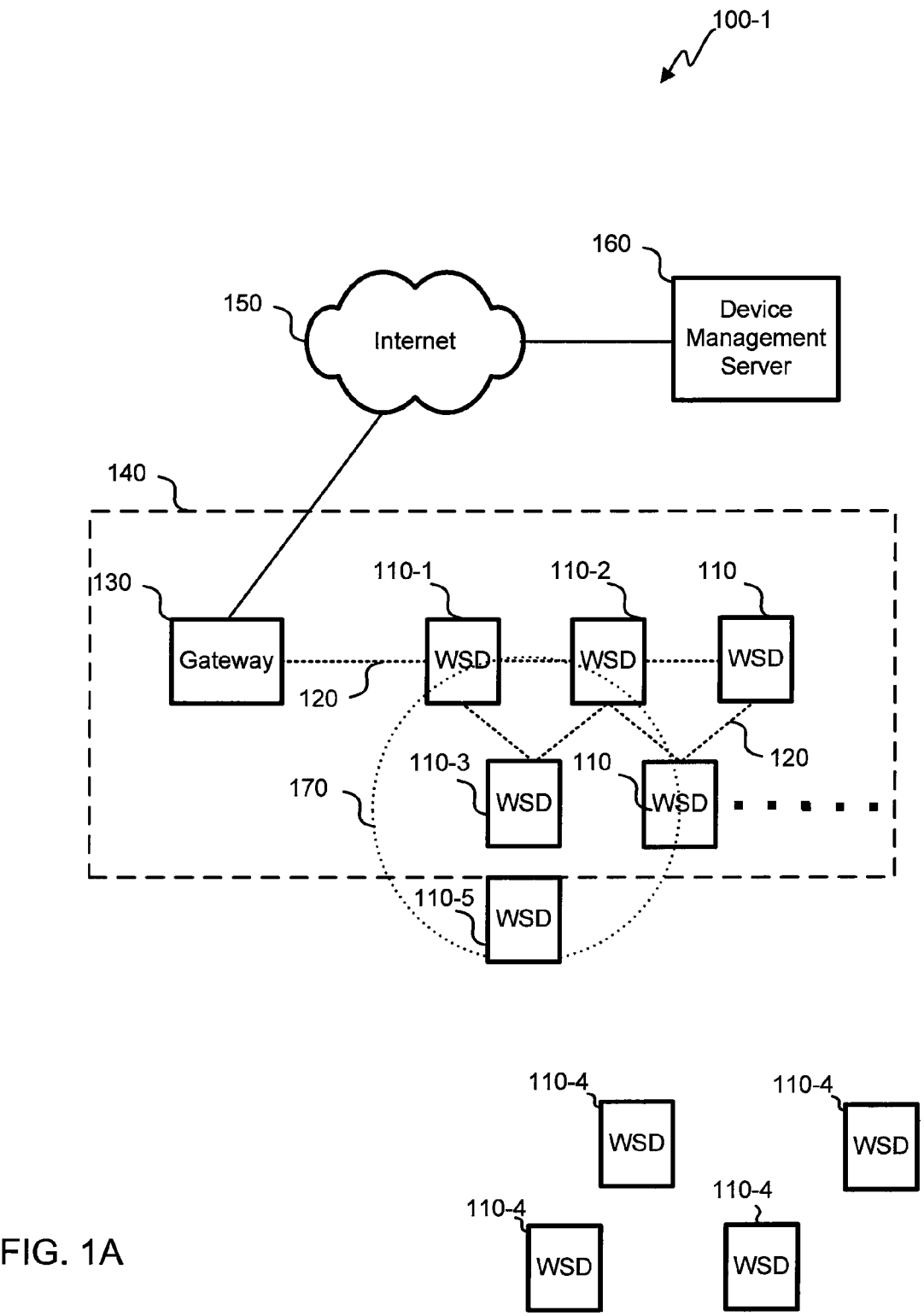
FIG. 1A is a block diagram of a logistical management system that incorporates a sensor network connecting wireless sensor devices (WSDs).

In the following description, for the purposes of explanation, numerous specific details are set forth in order to provide a thorough understanding of various embodiments. It will be apparent, however, to one skilled in the art that various embodiments may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the disclosed systems and methods as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, known circuits, processes, algorithms, structures, and techniques may be shown without unnecessary detail in order to avoid obscuring the embodiments.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine-readable medium. A processor(s) may perform the necessary tasks.

This disclosure will describe or refer to several wireless networks which link component wireless network devices (including wireless sensor devices (WSDs)). These networks may be configured in a variety of ways, and may be used in a variety of contexts. Example configurations include mesh, point-to-point, and/or ad hoc networks, among others. These networks may be designed to be dynamic and flexible, so as to enable network devices, or nodes, to join, move around within, and leave the network in an unscheduled manner. The WSDs linked by these networks may be configured to collect and communicate sensor information across a range of geographic locations covered by the network. By being organized in this way, the networks may be beneficially used to provide end-to-end monitoring, tracking, security and management of transportation and/or logistical systems. Although the techniques disclosed herein are described with respect to implementations involving wireless technologies, the techniques can be applied to various types of wired communication networks as well.

One example use of wireless networking for monitoring of transportation assets involves a wireless network comprising a plurality of WSDs fixed to cargo containers in a depot. The WSDs include sensors which enable measuring real-time data about the cargo containers on which the sensors are fixed. The WSDs could include any type of sensor for this purpose. For example, WSDs could be configured with a thermometer for measuring container temperature, a door sensor for detecting container door position, or a location detector for detecting container location.

The example wireless network can include a gateway device. WSDs that have joined the network transmit sensor information over the network, whereupon the information is routed to the gateway device. The gateway device collects the sensor information and provides it to systems outside the wireless network. As WSD-equipped containers enter and leave the depot, the wireless network will morph by joining new WSDs attached to containers entering the depot and disassociating WSDs attached to containers leaving the depot. Each WSD in the network is available to serve as a router for relaying sensor information from other WSDs that are not in direct communication with the depot's gateway device.

The example wireless network discussed above could be designed as a low-power wireless networks. Low power wireless networks can be advantageous in transportation, logistical, and similar applications where network devices are mobile devices operating on battery power. Although many battery-operated mobile devices utilize wireless technologies, most mobile devices exhaust their batteries in a matter of hours or days. The term "low-power wireless networks" as used herein refers to wireless networks utilizing technologies that enable battery-powered devices to operate for a year or more without exhausting their batteries. This can include technologies associated with the IEEE 802.15.4 and/or ISO/IEC 18000-7 standards, as well as various proprietary technologies, among others.

FIG. 1A is a block diagram of an example logistical management system 100-1 in which certain techniques and methods disclosed herein may be embodied. In the illustrated system, several WSDs 110 (certain of which are labeled as either 110-1, 110-2, or 110-3 so that they may be specifically referenced) are linked in a mobile sensor network 140 that enables these WSDs 110 to communicate data to a gateway 130. Each WSD 110, regardless of whether it is connected to the sensor network 140, may be attached to a logistical asset (not shown). The logistical assets to which WSDs 110 are attached may be mobile or transportable. For example WSDs 110 may be attached to train cars, busses, shipping containers, or any other unit or asset. When connected to the sensor network 140, WSDs 110 gather sensor data (hereinafter referred to as "status information") and communicate it through the network 140 so that the logistical units or assets can be monitored or tracked.

Each WSD 110 transmits its status information in data packets so that it will be wirelessly routed through the network 140 and ultimately delivered to the gateway 130. If a WSD 110 is separated from the gateway 130 by more than one hop of separation, intermediate WSDs 110 route the sensor information until it reaches the gateway 130.

In sensor network 140, each WSD 110 is either linked directly to the gateway 130, or is able to send status information to the gateway 130 by having the information routed by intermediate WSDs 110 that are connected on a multi-hop path to the gateway 130. For example, a WSD such as the one depicted at 110-3 may be configured to send data packets to WSD 110-2 or WSD 110-1. The WSD to which the packets are sent then routes the packets towards the gateway 130. Either of these WSDs can route the packets to another WSD so that the packets will eventually reach the gateway. When status information is transmitted from a WSD 110 at the periphery of sensor network 140, routing can be repeated as many times as necessary for the data packets to reach the gateway 130.

The gateway 130 provides connectivity between sensor network 140 and a device management server (DMS) 160. Communication between the gateway 130 and the DMS 160 can be relayed through the Internet 150, or any other Wide Area Network (WAN). Additionally or alternatively, other networks, such as Local Area Networks (LANs), can be used. Other configurations can include a gateway 130 communicating directly with the DMS 160 without a separate network.

The DMS 160 provides an interface between the sensor network 140 that can be used by a human user or another system, by utilizing, for example, a graphical user interface (GUI) and/or an application programmable interface (API). The DMS 160 can collect and store the information gathered by the WSDs 110. The data communicated between the DMS 160 and the gateway 130 can be securely communicated in encrypted packets, and the DMS 160 can provide secure management of the collected data.

One or more of a variety of physical layers may be used to provide the wireless connections 120 that support the sensor network 140. According to one embodiment, the WSDs 110 and gateway 130 communicate using a protocol stack based on IEEE 802.15.4 standard at 2.4 GHz using all 16 channels available in that standard. This physical layer enables the sensor network 140 to operate using very low power and/or predictable power consumption—which can be an important consideration for embodiments in which the WSDs 110 and/or gateway 130 operate on battery power. Nonetheless, other wireless technologies may be used, including IEEE 802.15.4 at 900 MHz; IEEE 802.11; Bluetooth®; IEEE 802.16; Ultra Wideband (UWB); MHz Industrial, Scientific, and Medical (ISM) Band; cellular; optical; and more, using multiple RF channels (e.g., narrow-band frequency hopping) or a single RF channel. The gateway 130 can communicate with the Internet 150 through a wired connection and/or a wireless connection.

Figure 4:
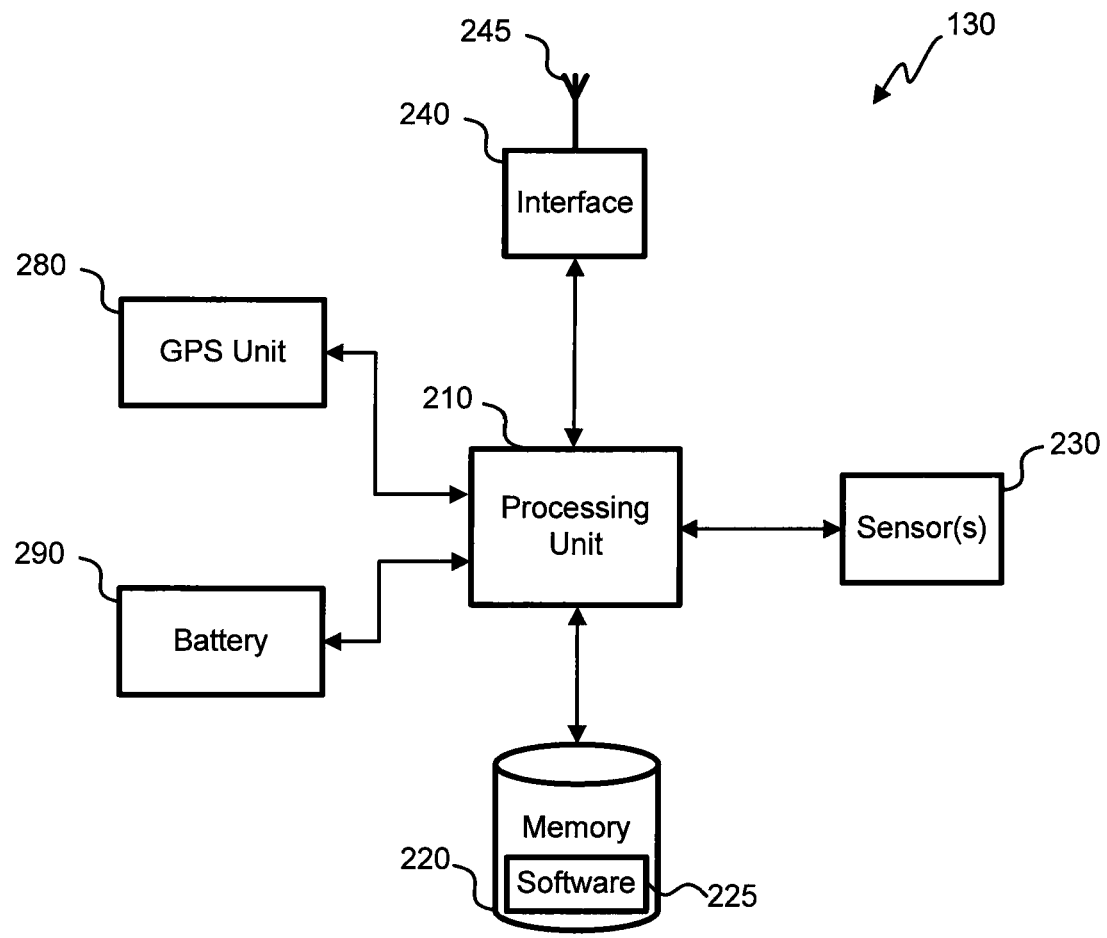
FIG. 4 depicts an example design of a gateway used in a wireless sensor network.

An example gateway device 130 is depicted in FIG. 4. This block diagram, as with other figures shown herein, is provided as an example only. Neither this diagram, nor any discussion thereof in this document shall be interpreted as limiting the scope of the disclosure in any way. It shall be understood that gateway devices need not be designed in any specific way to be within the scope of this disclosure.

As depicted in FIG. 4, the gateway device 130 is primarily controlled by a processing unit 210. The processing unit 210 can be comprised of one or more processors, microprocessors, and/or specialized integrated circuits. The processing unit 210 can access information provided by other components of the gateway device 130 and process this information in accordance with software 225 disposed in memory 220. Depending on desired functionality of the gateway device 130 and the capabilities of the processing unit 210, the software 225 can include an operating system with one or more executable programs. Alternatively, the software can include lower-level instructions, such as firmware and/or microcode, for the processing unit 210 to execute.

The internet interface 240 can be any of a variety of interfaces, depending on desired functionality. As indicated in FIG. 1A, the gateway device 130 can have a wired connection with the Internet, in which case the Internet interface 240 can include an Ethernet or other wired interface. Additionally or alternatively, the gateway device 130 can have a wireless connection with the Internet.

This disclosure will provide various techniques which can be used in several different ways to accelerate the expansion and broaden the coverage of sensor networks 140 and enhance sensor network capabilities with regards to gathering and reporting of status information and avoiding and repairing network disconnections and failures. The techniques are especially well-suited for use in a logistical management system 100-1, but may be used in other network environments as well. When implemented, the techniques may enable status information to be delivered to a sensor network 140 gateway 130 from WSDs 110 that are not connected to the sensor network 140. Hereinafter, the term "remote WSD" will be used to refer to any WSD 110 that is beyond the coverage of a sensor network 140, has become inadvertently disconnected from the network 140 due to congestion, lost communication links, or other disruption, or which has not joined the network 140 despite being within the coverage area.

The difficulties entailed in gathering status information from remote WSDs 110 is generally illustrated in FIG. 1A. In addition to WSDs 110 that are connected to the sensor network, FIG. 1A depicts remote WSDs 110-4 which are not connected to the wireless sensor network 140 because their location is beyond the wireless signaling range of the WSDs 110 that are attached to the network 140. The techniques and methods provided in this disclosure may enable remote WSDs 110-4 to periodically report status information to the network 140, even while remaining out of the range of network coverage.

This disclosure will describe how remote WSDs may separately form, expand and combine supplemental networks or establish communication channels. These networks or channels may be used by the remote WSDs to share status information with other remote WSDs. When a remote WSD receives status information from other remote WSDs in this way, it queues the information. The information remains queued by the remote WSD 110 until it eventually joins the sensor network at a later time.

Upon joining the sensor network 140, the WSD 110 transmits the status information through the network 140 so that it may be routed to the gateway 130. A remote WSD 110-4 which queues, transports, and communicates status information in this way provides what will be referred to as "courier functionality", and will be referred to hereinafter as a "courier WSD". Any communication channel, connection or network arrangement that links a courier WSD and one or more remote WSDs 110-4 without involving the sensor network 140 having the gateway 130 connection will be referred to hereinafter as a supplemental network.

FIG. 1B depicts a supplemental network 141 formed amongst the remote WSDs 110-4 previously shown in FIG. 1A. In addition to enabling remote WSD 110-4 status information to be transported to the sensor network 140 and gateway 130 by a courier WSD 110-4, a supplemental network 141 may be used to accelerate the process of ultimately attaching remote WSDs 110-4 to the sensor network 140. Supplemental networks 141 may thus be used to accelerate sensor network 140 expansion and the repair of network fractures that cause WSDs to become temporarily disconnected from the sensor network 140 in the manner shown with respect to WSDs 110-4. The use of supplemental networks 141 for these purposes will be discussed in greater detail in later paragraphs. However, before that description is provided, it should be noted that the WSD 110 functionality and procedures used to connect to a sensor network 140 are similar in many ways to the functionality and procedures used to connect to a supplemental network 141. Accordingly, the description provided herein with regards to WSD 110 interfacing with a sensor network 140 is largely applicable to an understanding of how a WSD 110 interfaces with a supplemental network 141 as well. Where functional differences exist, these differences will be explained in later paragraphs which discuss implementation details that enable WSDs 110 to form supplemental networks 141 and provide courier functionality.

A technique that enables WSDs 110 to seamlessly form supplemental networks 141 involves universal use of hop count and cost function information according to a common format, and regardless of WSD 140 network connection status. Commonly, networks are expanded using a methodology whereby network nodes indicate their availability to serve as a network connection point by providing a hop count and cost function in accordance with a format that is exclusive to network nodes. However, the techniques herein involve the use of WSDs 110 that are programmed to continuously provide a sensor network 140 beacon and a hop count and cost function in accordance with the common format, even when they have left the sensor network 140, become disconnected, or have not yet established a network connection. Additionally, WSDs 110 are programmed so that they will be triggered to perform network joining procedures with any WSD 110 from which such information is received.

Each WSD 110 that is connected to the sensor network 140 or to a supplemental network 141 stores a network hop count and cost function that is representative of its position in the sensor network 140. In both the sensor network 140 and any supplemental networks 141, the hopcount and cost function of a WSD 110 are used to represent the position of the WSD 110 in the network and its routing capabilities, respectively. In both types of networks 140, 141, the hopcount and cost function of a WSD 110 is determined based on the hopcounts and cost functions of next-hop WSDs 110. All WSDs 110 may be programmed with software which enables recognition of all hop counts and cost functions bearing the common format. Moreover, the software is such that when a WSD 110 receives hop count and cost function provided by any other WSD 110 and in accordance with the common format, recognition of the proper formatting alone triggers the receiving WSD 110 to perform network joining procedures with the other WSD 110.

The software used to control the network interfacing of a WSD 110 is designed so as to continuously generate a hop count and cost function that meets the format criteria, whether or not the WSD 110 maintains a sensor network 140 connection 120, supplemental network 141 connection 120, or maintains no connection at all. If a WSD 110 receives hop count and cost function information from one or more WSDs 110 to which it is connected, the receiving WSD 110 sets its own hop count and cost function based on the received information.

If a WSD 110 is not connected to any other WSD 110, it will therefore not receive any hop count or cost function information to reference. Despite not being connected, the WSD 110 activates what will be referred to hereinafter as a null interface. When a null interface is active at a WSD 110, the WSD 110 sets its hop count and cost information to a large default value which satisfies the format criteria. In this way, the hop count and cost function allow a WSD 110 to be recognized by other WSDs 110 as a network connection point at all times, regardless of its connection status. Thus, the WSD 110 software and its use of hop count and cost function information facilitates routing when a WSD 110 is attached to either the sensor network 140 or a supplemental network 141, and also facilitates the dynamic formation and expansion of supplemental networks between remote WSDs 110.

With regards to a WSD 110 that is connected to either the sensor network 140 or a supplemental network 141, there are several methods by which its cost function can be defined or determined based on the cost functions of next-hop WSDs 110. In certain network architecture within the scope of this disclosure, each WSD 110 cost may be set some amount higher than a next-hop WSD 110 cost, with the amount determined based on characteristics of the channel connecting the two WSDs 110. Additionally, or alternatively, costs may also be computed as a function of packet delay, latency, channel capacity, channel saturation, data rates, etc. In other arrangements within the scope of this disclosure, the cost function may be a function of the number of hops which separate the WSD 110 from the gateway 130. More complicated arrangements for computing cost functions may also be used. For example, the scope of this disclosure covers network architecture in which cost function is based on a combination of WSD 110 performance factors such as hop counts, path lengths, number of available paths to the gateway 130, latency, etc.

As will be explained in later paragraphs, each WSD 110 provides its hop count and cost function to every other WSD 110 with which a connection 120 is formed, whether in the sensor network 140 or in a supplemental network 141. Furthermore, in both the sensor network 140 and supplemental networks 141, WSD hop counts and cost functions are updated as WSDs 110 form new network connections 120 and enter and leave the network. Typically, when a WSD 110 routes data, the data is routed to the next-hop WSD 110 having the lowest hop count or cost function of all the WSDs 110 connected to the routing WSD 110. At each WSD 110, communications with this next-hop WSD 110 are controlled and prioritized over communications with other WSDs 110 by a default interface. Default interfaces will be described with reference to later drawings.

For the purposes of this disclosure, the connections 120 between WSDs 110 can be described as "upstream" or "downstream". A first WSD 110 is "upstream" with respect to a second WSD 110 if it has a lower hopcount than the second WSD 110, and its network connections 120 place it on a pathway between the second WSD 110 and the gateway 130 (sensor network) or WSD 110 having the lowest cost function (supplemental network 141). In such a case, the second WSD 110 would be considered, for purposes of this disclosure, to be "downstream" with respect to the first WSD 110.

WSDs 110 connect with the wireless sensor network 140 and supplemental networks 141 by using beaconing and scanning techniques. For example, WSDs 110 broadcast beacons when they are connected to either the wireless sensor network 140 or a supplemental network 141. One such beacon is depicted at 170 in FIG. 1A. WSDs 110 which are not connected to a network 140, 141 detect the beacons. Detected beacons serve to inform a receiving WSD 110 of the presence of the network 140, 141 and the availability of the beaconing WSD 110 to serve as a network 140, 141 connection point. In FIG. 1A, WSD 110-5 is depicted as not being attached to sensor network 140. Furthermore, FIGS. 1A and 1B are intended to suggest that the beacon 170 is detected by WSD 110-5, which is within beacon detection range of the beaconing WSD 110-3.

A beacon broadcasted by a WSD 110 can include information such as authentication data, a beacon packet number, or a network identification number. Information such as the beacon packet number can comprise a predetermined pattern that indicates the length of a beaconing sequence and/or a time at which the receiving WSD 110 can attempt to join the sensor network 140 or a supplemental network 141. WSDs 110 connected with the wireless sensor network 140 or a supplemental network can act as "WSD servers" by transmitting beacons periodically. Hereinafter, WSDs 110 which are attached to a network may be referred to interchangeably as WSDs 110 or WSD servers 110. On the other hand, WSDs 110 which are not yet connected with a network can act as "clients" by periodically scanning for beacons transmitted by the servers.

The scanning and beaconing periods of the clients and servers 110 can be offset and/or adjusted in length to help ensure that, eventually, a client's scan will detect, or "capture," a server's beacon 170. More detailed information about scanning and beaconing processes, as well as subsequent joining processes, can be found in U.S. Pat. No. 8,416,726, entitled "LOW POWER WIRELESS NETWORK FOR TRANSPORTATION AND LOGISTICS," which is expressly incorporated by reference in their entirety.

After capturing a server's beacon 170, a client 110 can attempt to join the network 140, 141 by establishing a wireless connection 120 with the WSD 110 server. The joining process can occur through an exchange of data at a designated time after the beaconing and/or scanning process. The exchange of data may involve the WSD server 110 providing its hop count and a cost metric to the joining WSD 110. The joining WSD 110 can then determine its own hop count and cost function based on the WSD server 110 information, and create an upstream interface to be used for controlling communications with the WSD server 110. The server WSD 110 creates a downstream interface to control its communications with the joining WSD 110.

An interface is a software module defined with respect to a specific next-hop connection 120 in the sensor network 140 or supplemental network 141. An interface includes an object specific to a next-hop WSD 110 and associated instructions which are executable to control network-related functionality for using the next-hop connection 120.

At each WSD 110, interface instructions may be used to control the scheduling, transmitting, receiving and routing of status information. An interface object is used to store and reference routing information about the next-hop WSD 110 with which the interface is associated. The information can include the next-hop WSD 110 network identifier, hop count and cost function.

When a WSD 110 forms a supplemental network 141 connection 120 or sensor network 140 connection 120, one upstream interface in memory is designated as a default interface. The default interface is the interface that is prioritized for transmitting or routing status information. A WSD 110 transmits status information to the WSD 110 associated with the default interface unless that WSD 110 is unavailable for routing. Designating a default interface may be done based on hop count or cost function so that the default interface is the upstream interface associated with either the smallest hopcount or the lowest cost function.

When attached to the sensor network 140 or a supplemental network 141, a WSD 110 may transmit a beacon 170 to facilitate the joining of other WSDs 110 to the network 140, 141. Beacon 170 signals are formatted in accordance with a common protocol regardless of the network 140, 141 that a beaconing WSD 110 is attached to. Accordingly, when a beacon 170 is received by a WSD 110, it triggers the receiving WSD 110 to perform a same series of procedures regardless of whether the beaconing WSD 110 is attached to the sensor network 140 or a supplemental network 141.

Beaconing and joining procedures may be used to establish an additional network connection 120 between two WSDs 110 which are already connected to the sensor network 140 or a supplemental network 141. WSDs 110 which are already connected to the network may establish additional connections 120 with other connected WSDs 110 in order to supplement existing connections 120. Additional connections 120 between WSDs 110 strengthen the network 140, 141 by reducing points of vulnerability. Also, in the sensor network 140, additional connections 120 may provide a WSD 110 with a path to the gateway 130 which is superior to the paths made possible by existing connections 120.

Such additional connections 120 are facilitated by WSDs 110 continuing to perform beacon scanning after attaching to a network 140, 141. In this way, a connected WSD 110 may detect the beacon 170 of another connected WSD 110. Both WSDs 110 may then exchange hop count and cost function information, and each of the two WSDs 110 may use this information to establish an upstream and/or downstream interface with respect to the other. If the upstream interface created by either of these WSDs 110 reflects a lower hop count or cost function than its current default interface, the new upstream interface may be designated as the default interface.

In a similar manner, beaconing and joining procedures may also be used to establish a network connection 120 between a WSD 110 connected to a supplemental network 141 and a WSD 110 connected to the sensor network 140 or a different supplemental network 141. As explained above, WSDs 110 that maintain a network connection 120 may broadcast beacons 170 and scan for the beacons 170 of other WSDs 110. Because WSDs 110 are configured to broadcast beacons 170 according to a common protocol regardless of the network 140, 141 in which they are connected, a beacon 170 broadcasted by a WSD 110 in the sensor network 140 may be detected by a WSD 110 in a supplemental network 141, or vice versa. Regardless of the network connections 120 that are involved, the beacon 170 triggers the detecting WSD 110 to perform joining procedures with the WSD 110 from which the beacon 170 was received. A connection 120 is formed between these WSDs 110, and the respective WSD 110 hop counts and cost functions are exchanged. The WSD 110 having the higher hop count or cost function establishes an upstream interface with the other WSD 110, and then updates its own hop count and cost function to reflect the newly formed connection 120. In the process, the two networks 140, 141 are joined as a single network that links all WSDs and other network assets from the predecessor networks.

The logistical management system 100-1 and sensor network 140 depicted in FIG. 1A is shown as an example only, and shall not be construed as limiting the scope of this disclosure in any way. This disclosure is intended to encompass logistical management systems which use sensor networks having any number of WSDs 110, and which are characterized by any topology. The topology shown with respect to sensor network 140 is provided for example purposes only, and is highly simplified as compared to other sensor networks within the scope of this disclosure. For instance, the network topology can be such that at a first level of depth, multiple next-hop WSDs 110 are linked directly to the gateway 130. Any WSDs 110 at the first level of depth can be wirelessly linked to any number of WSDs 110 at a second level of depth. Each WSD 110 at the second level of depth is therefore separated from the gateway by two hops, and can be linked to any number of WSDs 110 at a third level of depth, and so on. Moreover, multiple gateways 130 and/or sensor networks 140 may be included in a logistical management system 100.

In general, the sensor network 140 topology may be dictated by the monitoring, tracking or data gathering purpose that the sensor network 140 serves, and the disposition of assets or units to which the network WSDs 110 are attached. For example, a sensor network 140 could be applied to track or monitor rail cars in a train depot. With WSDs 110 being attached to rail cars in such an arrangement, the network topology could, in certain situations, involve a dense clustering of WSDs 110 at a frequently utilized area of the depot, and could change dynamically as rail cars enter or leave the depot. Additionally or alternatively, the depot could store rail cars in smaller clusters, some of which might be located in remote reaches of the depot or at a significant distance from any other clusters. In such a situation, the dispersion of rail cars and clusters could limit the coverage of the sensor network 140 and its ability to expand and incorporate new WSDs 110 when rail cars are moved into the depot.

Figure 2:
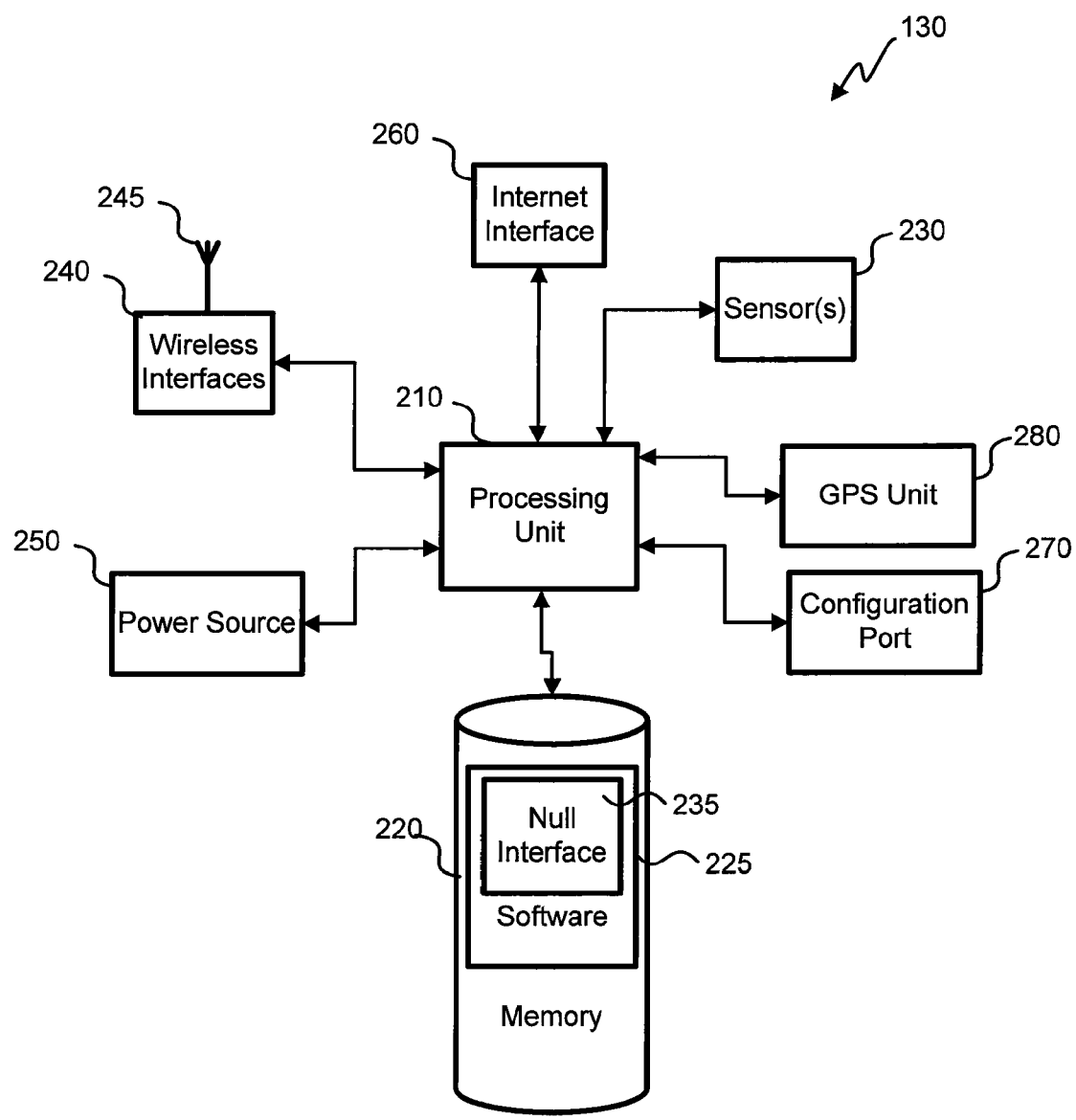
FIG. 2 is a block diagram of wireless sensor device (WSD) designed to implement the methods, techniques and operations disclosed herein.

FIG. 2 is a block diagram of one example design of a WSD 110 configured to connect to a sensor network 140, form or connect to a supplemental network 141, and provide courier WSD functionality prior to being connected to a sensor network 140. The configuration shown in FIG. 2 also enables a WSD 110, while not connected to the sensor network 140, to interface with and provide status data to another WSD 110 in such a way as to enable the other WSD 110 to provide courier functionality.

The illustrated WSD 110 design shown in FIG. 2 includes a sensor(s) 230, processing unit 210, and memory 220. The WSD 110 can also include a GPS unit 280 to provide location information. Location information can be particularly useful where a sensor network 140 is spread over a large physical area. The GPS unit 280 can be used to sense WSD 110 velocity based on changes in calculated location over time. As will be explained in subsequent paragraphs, the processing unit 210 may activate procedures for providing courier functionality when data provided by the GPS unit 280 indicates that the WSD 110 has recently been, or is currently being moved.

The processing unit 210 may be a microprocessor and the memory 220 and software 225 can comprise programmed microprocessor logic. The software 225 may be modularized or object-oriented software used to control the network discovery, communications and routing functionality of the WSD 110.

As will be explained in greater detail in subsequent paragraphs, the processing unit 210 may execute the software 225 to control the process of establishing next-hop sensor network 140 or supplemental network 141 connections 120 with other WSDs 110. The processing unit 210 also executes the software 225 for controlling the connections 120 associated with courier WSD functionality. For each connection 120 established, the processing unit 210 executes the software 225 to create the appropriate upstream or downstream interface, and to store the interface in memory 220.

A WSD 110 maintains an upstream interface by periodically receiving routing information from the upstream WSD 110 associated with the interface. The routing information from an upstream WSD 110 includes the upstream WSD 110 hop count and cost function. The other information may indicate a number of alternate pathways between the upstream WSD 110 and the gateway, hop-counts or latency information associated with these pathways, or any other information relevant to determining a cost function representative of the cost of routing information to the gateway via the upstream WSD 110.

When an upstream interface is created, the software 225 instructions cause the WSD 110 to compare the upstream hop-count or cost function with the hop-count or cost function of the default interface. If the hop-count or cost function of the newly created interface is less than the hop-count or cost function of the default interface, the newly created interface is assigned as the new default interface. Otherwise, the newly created interface is stored in memory 220 for possible activation as the default interface at a later time.

A WSD 110 maintains each of its downstream interfaces by periodically communicating routing information to the downstream WSD 110 associated with the interface. When an upstream WSD 110 maintains a downstream interface by communicating routing information, the upstream WSD 110 communicates its most recently computed hop count and cost function. A WSD 110 may determine its hop count and cost function based on the hop count and cost function associated with its default interface. A downstream WSD 110 which receives hop count and cost function from an upstream WSD 110 may update its corresponding upstream interface to reflect this information.

The memory 220 also includes a status information transmission queue (not depicted) for each upstream interface. The WSD processing unit 210 uses a queue to order status information received from downstream WSDs 110 and store the information until it can be transmitted to an upstream WSD 110. When a WSD 110 receives status information from a downstream WSD 110, the information is queued in the default interface queue, unless this queue is full. If the default interface queue is full, the status information is placed in the queue of another upstream interface, provided that a secondary upstream connection and interface is maintained.

Received status information may be ordered in an upstream interface queue based on the order in which it is received. Moreover, transmitting information in the queue may be performed using a "first in, first out" methodology.

Within each WSD 110, the software 225 includes instructions which cause the WSD 110 to recognize when there are no interfaces being maintained with other WSDs (i.e determine that the WSD is neither connected to the sensor network 140 nor any supplemental network 141). In response to such a recognition, the software 225 further causes the WSD 110 to activate what will be referred to hereinafter as a null interface 235. The null interface 235 is a software 225 module which enables a remote WSD 110-4 to form supplemental network 141 connections 120 and use those connections to provide courier functionality.

Any number of remote WSDs 110-4 may activate a null interface 235 at any time that there are no connections 120 with other WSDs 110 being maintained. Alternatively, remote WSDs 110-4 may be configured so that a minimum velocity condition is also required for a null interface 235 to be activated. In the latter case, WSD 110 processing unit 210 may be configured to determine whether the WSD 110 is being moved based on information provided from the GPS unit 280. The WSD 110 processing unit 210 may then activate the null interface 235 only after substantial movement of the WSD 110 has been detected.

A WSD 110 null interface 235 may be hard encoded so that the null interface 235 may be repeatedly activated and deactivated, as dictated by the movement of the WSD 110 and its pattern of connecting to the sensor network 140. Because null interface 235 instructions are hard-encoded and may be repeatedly executed, the null interface 235 is therefore depicted as residing within memory 220 in the WSD 110 shown in FIG. 2.

A null interface 235, when activated by a remote WSD 110-4, causes the remote WSD 110-4 to function similarly, in many respects, to a WSD 110 that is connected to the sensor network 140. The null interface 235 is essentially an upstream interface which is not associated with any physical upstream connection. The null interface 235 includes a queue and an arbitrarily large hop count and cost function represented in accordance with the same hop count and cost function format used by WSDs 110 which maintain a connection 120 to the sensor network 140. When a WSD 110 activates a null interface 235, the lack of connections with other WSDs 110 causes the upstream interface to become the default interface.

While the null interface 235 is active, the WSD 110 broadcasts a beacon 170 signal formatted in accordance with the same protocol used by WSDs 110 attached to the sensor network 140. The beacon 170 signal may be detected by other remote WSDs 110 or WSDs 110 that are connected to the sensor network 140, and these other WSDs 110 may perform joining procedures with the WSD 110 at which the null interface 235 is active.

Because the beacon 170 signal is indistinguishable from the beacon 170 signals of WSDs 110 that are connected to the sensor network 140, the fact that the courier WSD 110 temporarily lacks a network connection 120 and the ability to route information to the gateway 130 is transparent to remote WSDs 110-4 that detect the beacon 170. Thus, a remote WSD 110 that detects the beacon 170 will connect with the WSD 110 by executing the same software 225 instructions that facilitate the joining procedures for attaching to sensor network 140.

The null-interface WSD 110 creates downstream interfaces with respect to each remote WSD 110 which joins in this way. The null interface 235 hop count and cost function are provided to these downstream WSDs 110, and are used by each such downstream WSD 110 to create an upstream interface. The downstream WSDs 110 designate the upstream interface as the default interface which enables and prioritizes the transmission of status information to the null interface WSD 110.

After connecting with a null interface WSD 110 in this way, downstream WSDs 110 determine their hop count and cost function based on the hop count and cost function associated with the upstream interface. These downstream WSDs 110 then transmit beacon 170 signals which enable the supplemental network 141 to expand outwards and connect growing numbers of WSDs 110.

Because all WSDs 110 in the supplemental network 141 determine their hop count and cost function based on the hop count and cost function of an upstream interface, all status information in the supplemental network 141 is routed to the null interface WSD 110. The null interface WSD 110 queues all such information in the null interface 235 queue for later delivery to the sensor network 140. This courier functionality provided by the null interface WSD 110 does not depend on maintaining the supplemental network 141 connections with downstream WSDs because the status information can be routed upstream to the null interface WSD 110 as soon as the supplemental network 141 is formed, and can be held in the null interface 235 queue whether or not any of the supplemental network 141 connections 120 are maintained.

Moreover, the null interface 235 includes instructions which causes information in the null interface 235 queue to remain in the queue for so long as the null interface 235 remains as the default interface. When the null interface 235 ceases to be the default interface upon a connection with the sensor network 140 being formed, the null interface 235 instructions cause all information in the null interface 235 queue to be shifted to the queue of the new default interface. Because the new default interface is associated with an actual upstream connection 120, the status information in the queue 120 is transmitted to the WSD 110 associated with the default interface.

The hop count and cost function for a null interface 235 are set to large default values in order to avoid interfering with the possible sensor network 140 connections 120 maintained by remote WSDs 110 that are within signaling range of the null interface WSD 110. For example, the beacon 170 of a null interface WSD 110 could be received by a WSD 110 which is connected with the sensor network 140 and is actively reporting status information to the gateway 130 via its upstream interface. Alternatively, the beacon 170 of a connected WSD 110 could be received by a null interface WSD 110. In either of these situations, the connected WSD 110 is provided with the large hopcount and cost function information associated with the null interface WSD 110. This connected WSD 110 compares this information to the hop count and cost information associated with its default interface.

Because the hopcount and cost function of the null interface WSD 110 are large, the WSD 110 connected to the sensor network 140 will not alter its default interface. This is appropriate, since, in such a situation, the default interface provides a pathway to the gateway 130, while the null interface WSD 110 does not. The default interface will remain unchanged, enabling the WSD 110 to remain connected to the sensor network 140.

FIGS. 3A, 3B, 3C and 3D depict a common method of network formation and expansion that is commonly used to expand and grow wireless sensor networks. The formation of supplemental networks 141 amongst remote WSDs 110 may be used to, amongst other things, expand a network in a way that avoids certain delays and inefficiencies associated with the methodology illustrated in FIGS. 3A-3D. In fact, FIGS. 3A-3D are provided so as to explain the delays and inefficiencies which may be avoided through the formation of supplemental networks 141 amongst remote WSDs 110-4 while a sensor network 140 is expanded.

Before discussing the specific details shown in FIGS. 3A-3D, it is helpful to consider a general overview of the network expansion techniques represented in those drawings. When a network expands in the manner depicted, nodes transmit beacon signals upon attaching to the network. A node's beacon signals the availability of the node to serve as a connection point for joining the network. Thus, once a first node has attached to a network and commenced transmitting its beacon signal, a second node may detect the beacon, and perform joining procedures with the first node. During the joining procedure, the first node provides its hop count and cost function to the second node. After the joining procedures, the second node is connected to the network Once attached to the network, the second node sets its hop count and cost function based on the hop count and cost function of the first node. For example, the hop count of the second node will be one hop larger than the hop count of the first node. The cost function of the second node may also be determined from the cost function and/or hop count of the first node, and in accordance with a formula or methodology which relates the cost function of a joining node to the cost function of a server node.

After joining, the second node may also transmit a beacon signal. The beacon signal from the second node may be used to expand the network to cover nodes which are within signaling range of the second node, but are not within range of the first node. A third node may detect either the beacon of the first node or the beacon of the second node. The third node may then perform joining procedures which involve receiving hop count and cost function information sent by the detected node. Once the third node is attached to the network, it begins transmitting a beacon signal. Nodes may continue attach individually in this way as the network continues to grow. Additionally, when a group of nodes is disconnected from the network, the disconnected nodes may be rejoined to the network based on a similar series of connection procedures. Hereinafter, networks which take shape by connecting and reconnecting nodes in this incremental manner will be referred to as incrementally expanding networks.

Figure 3D:
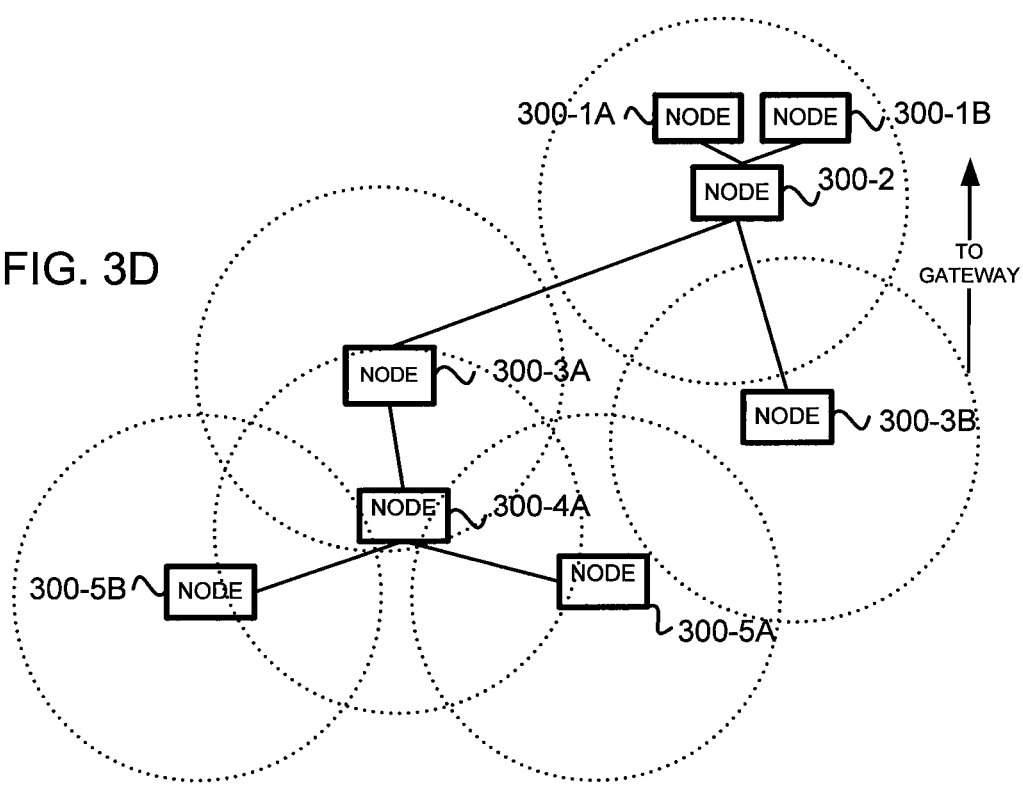

The operations associated with this incremental sequence are depicted in FIGS. 3A, 3B, 3C and 3D, and will now be described. As depicted in FIG. 3A, a node 300-2 has attached to a network at the network periphery. Node 300-2 is shown as initially being attached to 2 network nodes 300-1A, 300-1B. Other nodes 110 that are not connected to the network are also depicted in the vicinity of the network.

Because node 300-2 is connected to the network, it periodically transmits beacon signal, as depicted at by the dashed circular line around the node. WSDs 300-1A and 300-1B periodically broadcast beacons, but these beacons are not depicted in any of FIG. 3A, 3B, 3C or 3D for purposes of simplicity. Nodes 300-3A and 300-3B are within signaling range of node 300-2, and are able to detect the beacon. Following detection of the beacon, both node 300-3A and node 300-3B commence joining procedures with node 300-2, and connect to the network, as shown in FIG. 3B.

Once node 300-3A and node 300-3B are connected to the network, they periodically transmit beacon signals, as depicted in FIG. 3C. Because node 300-4A is within signaling range of node 300-3A, it is able to detect the beacon of node 300-3A. Following detection of the beacon, node 300-3A commences joining procedures with node 300-3A, and connects to the network, as shown in FIG. 3C.

Once node 300-4A is connected to the network, it periodically transmits a beacon signal, as depicted in FIG. 3C. Because node 300-5A and node 300-5B are within signaling range of node 300-4A, they detect the beacon of node 300-4A. Following detection of the beacon, node 300-5A and node 300-5B commence joining procedures with node 300-4A, and connect to the network, as shown in FIG. 3D.

When a sensor network is used in a logistical management system 100-1, expanding the sensor network through the incremental attachment of individual WSDs 110 may sometimes enable the network to quickly scale in size to include large numbers of nodes. Expansion in this way may occur most rapidly when a high density of nodes are tightly clustered in proximity to the gateway. However, FIGS. 3A-3D suggests how incremental expansion of a sensor network may result in network formation and communication delays when WSDs 110 are dispersed. For example, when the network expands incrementally and a topology like the one depicted in FIGS. 3A-3D exists, nodes 300-5A and 300-5B may be inhibited from establishing any network communication links until node 300-4A has joined the network. WSD 300-4A, in turn, may be inhibited from joining the network until WSD 300-3A has joined.

Because WSDs 110 may have limited power availability, low transmission power may be used to transmit beacons and joining information. For this reason, it may take relatively long periods of time for remote WSDs 110 to detect the beacon of a connected WSD 110 and complete joining procedures. When a sensor network 140 has a decentralized topology and is intended to expand widely so as to include WSDs 110 separated by many hops from the gateway 130, these incremental expansion delays may be substantial.

Incremental network expansion may also be associated with delays in rejoining disconnected clusters of WSDs 110 when a network fracture has occurred. Because of the dynamic nature of wireless sensor networks 140 used for tracking transportation assets and the fact that these networks may be used to link dispersed WSDs 110, a key factor affecting network scalability, capacity and coverage is the rate at which these networks reconnect clusters of WSDs which have become disconnected as result of a departing WSD 110 or failed network link. This is especially true when a wireless sensor network 140 is used to link nodes which are spread over a very large area and which move frequently.

For example, when a wireless sensor network 140 is used to link transportation assets across a city, the movement of the transportation assets may result in some of the WSDs 110 becoming dispersed to the extent that they are only within signaling range of a small number of upstream WSDs 110. For this reason, these upstream WSD's 110 may be the only available connection points for the dispersed downstream WSDs 110.

As a result of the limited number of sensor network connection points available to the downstream WSDs 110, they may be increasingly vulnerable to becoming disconnected by communication link failure or the departure of an upstream WSD 110. The vulnerability of any such WSD 110 to being disconnected also affects other downstream WSDs 110 which rely on the upstream WSD 110 to route communications to the gateway 130.

Figure 5A:
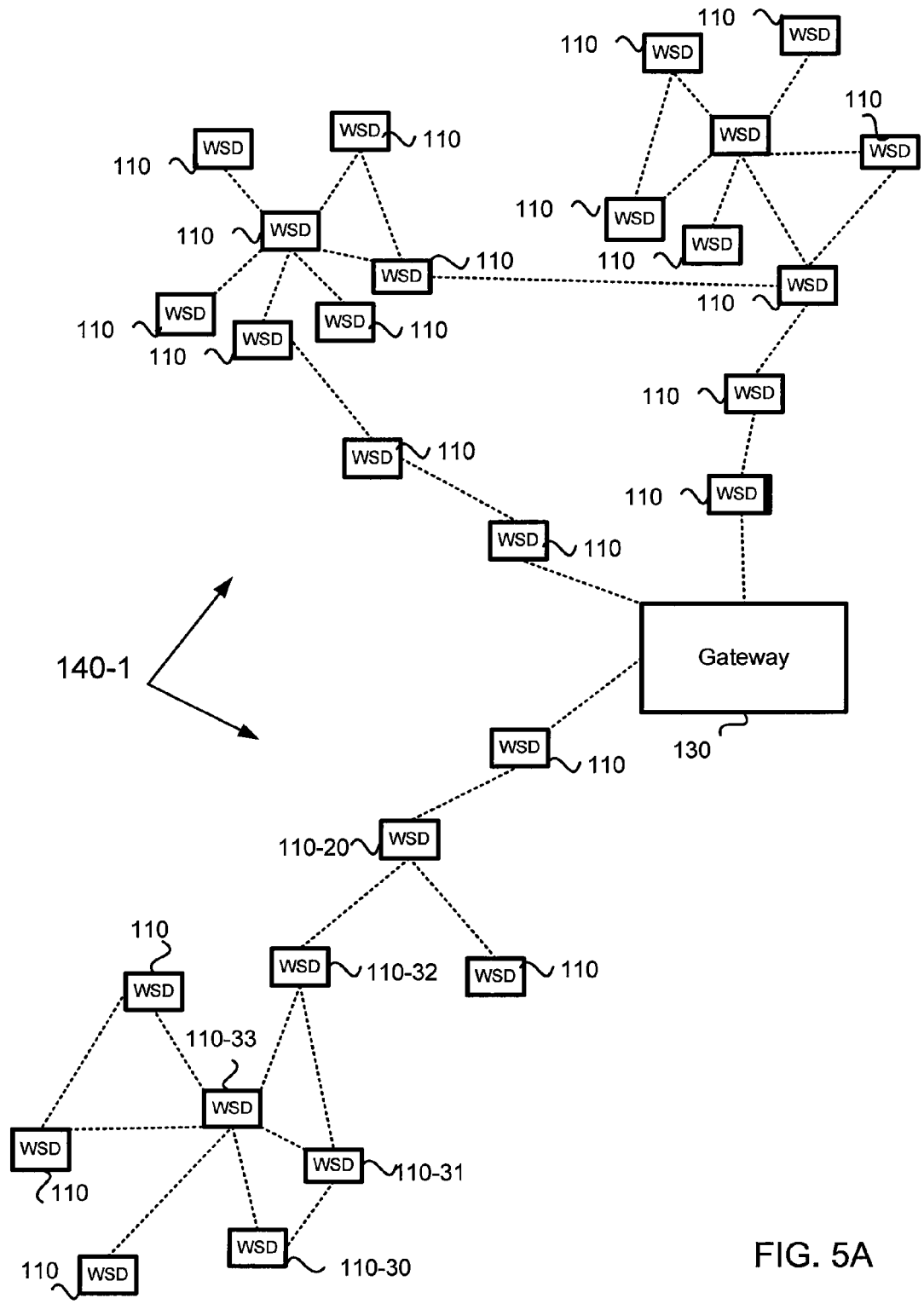
FIGS. 5A-5H are diagrams of a group of WSDs forming a portion of a wireless sensor network, according to one embodiment.
Figure 5B:
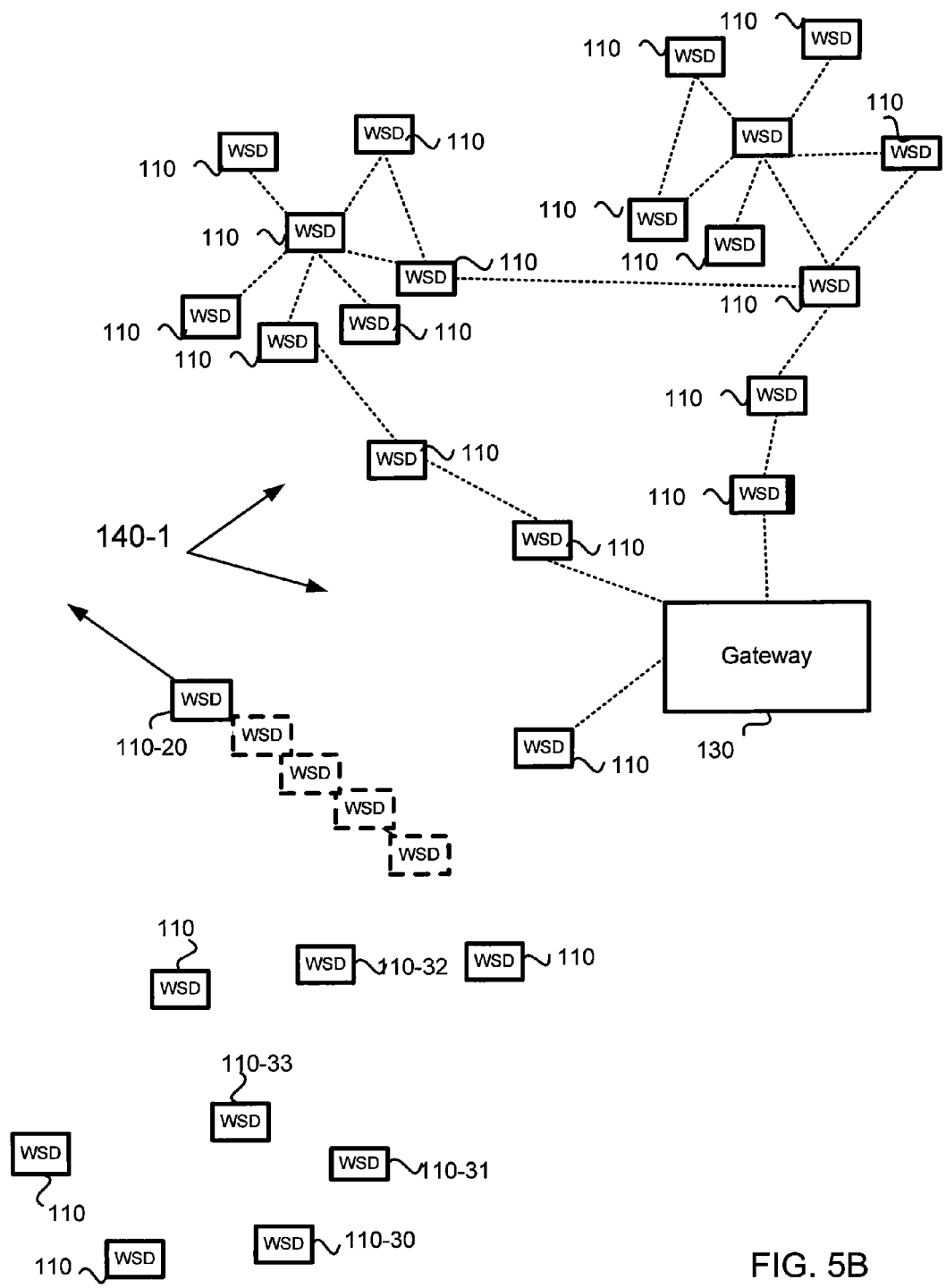

FIG. 5A and FIG. 5B depict how WSDs 110 in a sensor network 140-1 may be vulnerable to the disconnection of an upstream WSD 110. FIG. 5A illustrates an example wireless sensor network 140-1 organized around a gateway 130. In the depicted network 140-1, WSDs 110 (two of which are labeled as 110-20 or 110-30 for purposes of differentiation) are used to track the geographic location of a transportation asset to which they are attached. WSDs 110 in the network 140-1 that are located more than one hop from the gateway 130 periodically report position information to an upstream WSD 110. In turn, upstream WSDs 110 route the information to the gateway 130, thereby enabling the position of all nodes in the sensor network 140-1 to be reported to the device management server 160. As depicted in FIG. 5A, the transportation assets tracked by the sensor network 140-1 are dispersed. Certain network coverage areas include clusters of closely spaced WSDs 110, each of which would become disconnected from the network upon the failure of a single communication link. For example, FIG. 5A is meant to suggest how downstream WSDs such as WSDs 110-30, 110-31, 110-32 and 110-33 could be disconnected from the network 140-1 upon the failure of a single communications link, or the departure of WSD 110-20 from the network.

This disconnection scenario is depicted as having occurred in FIG. 5B. Here, the relative locations of WSDs 110 is generally the same as in FIG. 5A. However, one WSD (WSD 110-20, as seen in both FIGS. 5A and 5B) has moved outside of the coverage of the network 140-1. Because, WSDs 110 downstream of WSD 110-20 did not have an alternate connection to the network 140-1 as a result of the disperse network topography, the departure of WSD 110-20 is depicted as having caused a fracture in which the downstream WSDs 110 have been severed from the sensor network 140-1. In this condition, because of the disconnection, each previously-existing communication pathway that included a disconnected WSD 110 has been lost, and none of the disconnected WSDs 110 is capable of routing location information to any of the other WSDs 110 closer to the gateway 130. This deficiency exists despite the fact that several of the disconnected WSDs 110 are clustered within signaling range of each other.

When a network's architecture incorporates the previously-explained incremental network expansion framework, in a network fracture situation such as the one depicted in FIG. 5B, each disconnected WSD 110 might remain disconnected for a substantial period of time. For example, each such WSD 110 may remain disconnected until it is within signaling range of a connected WSD 110. For most of the WSDs, 110 this condition may not occur until either the WSD 110 is moved closer to a connected WSD 110, or a new WSD 110 joins the network near the previous position of WSD 110-20 and a subsequent series of incremental network expansions takes place.

However, when WSDs 110 are designed to operate using methods described in this disclosure, the disconnected WSDs 110 may form supplemental networks 141 which can grow in isolation from the sensor network 140. The supplemental networks 141 may accelerate the process of repairing the fracture by rejoining remote WSDs 110 to the sensor network 140 after they have become disconnected by the fracture. Additionally, or in other situations, supplemental networks 141 may enable a mobile WSD 110 to provide courier functionality. In this way, status information may be transported from disconnected WSDs 110 to the sensor network 140, and may reach the gateway 130 before the disconnected WSDs 110 rejoin the sensor network 140.

FIGS. 5C-G provides a generalized depiction of how supplemental networks 141 may expand in isolation from a sensor network 140-1 and accelerate rejoining of WSDs 110 to the sensor network 140-1 following a sensor network fracturing such as the one depicted in FIG. 5B. Additionally, FIG. 5H illustrates how, following the sensor network fracture depicted in FIG. 5B, the formation of supplemental networks 141 enables a mobile WSD 110-30 to provide courier functionality and thereby obtain status information from disconnected nodes and provide it to the sensor network 140.

Figure 5C:
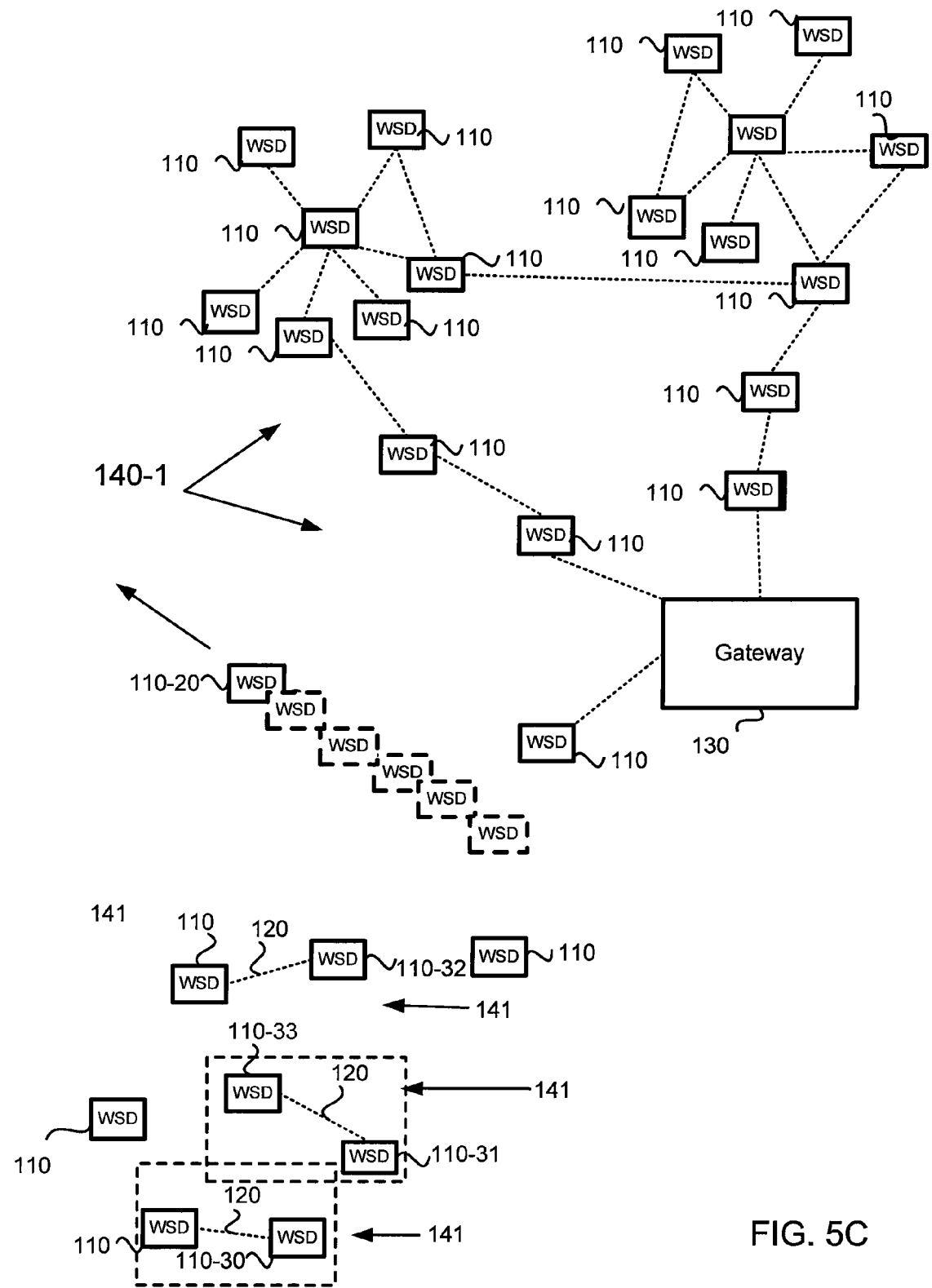
Figure 5D:
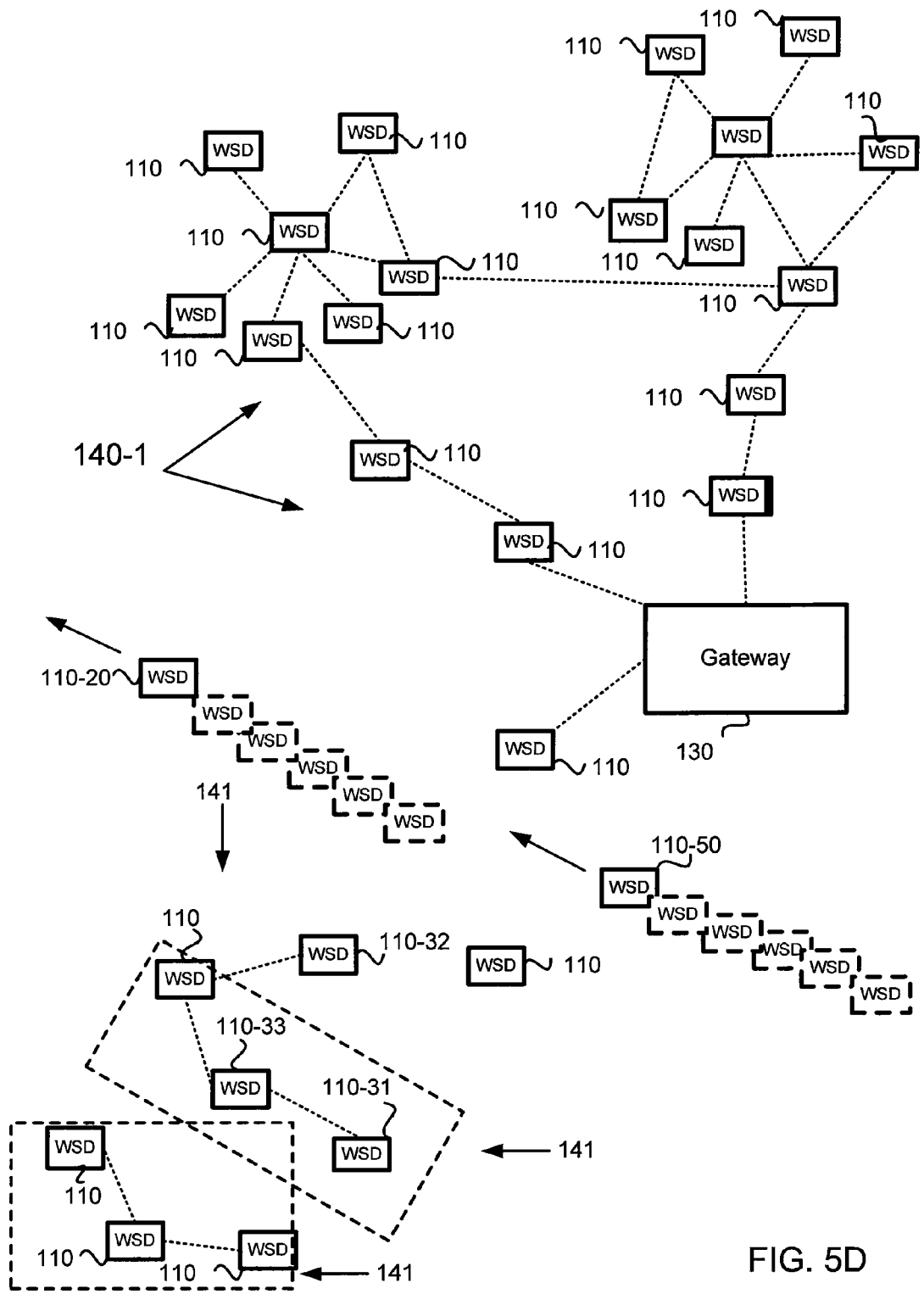
Figure 5E:
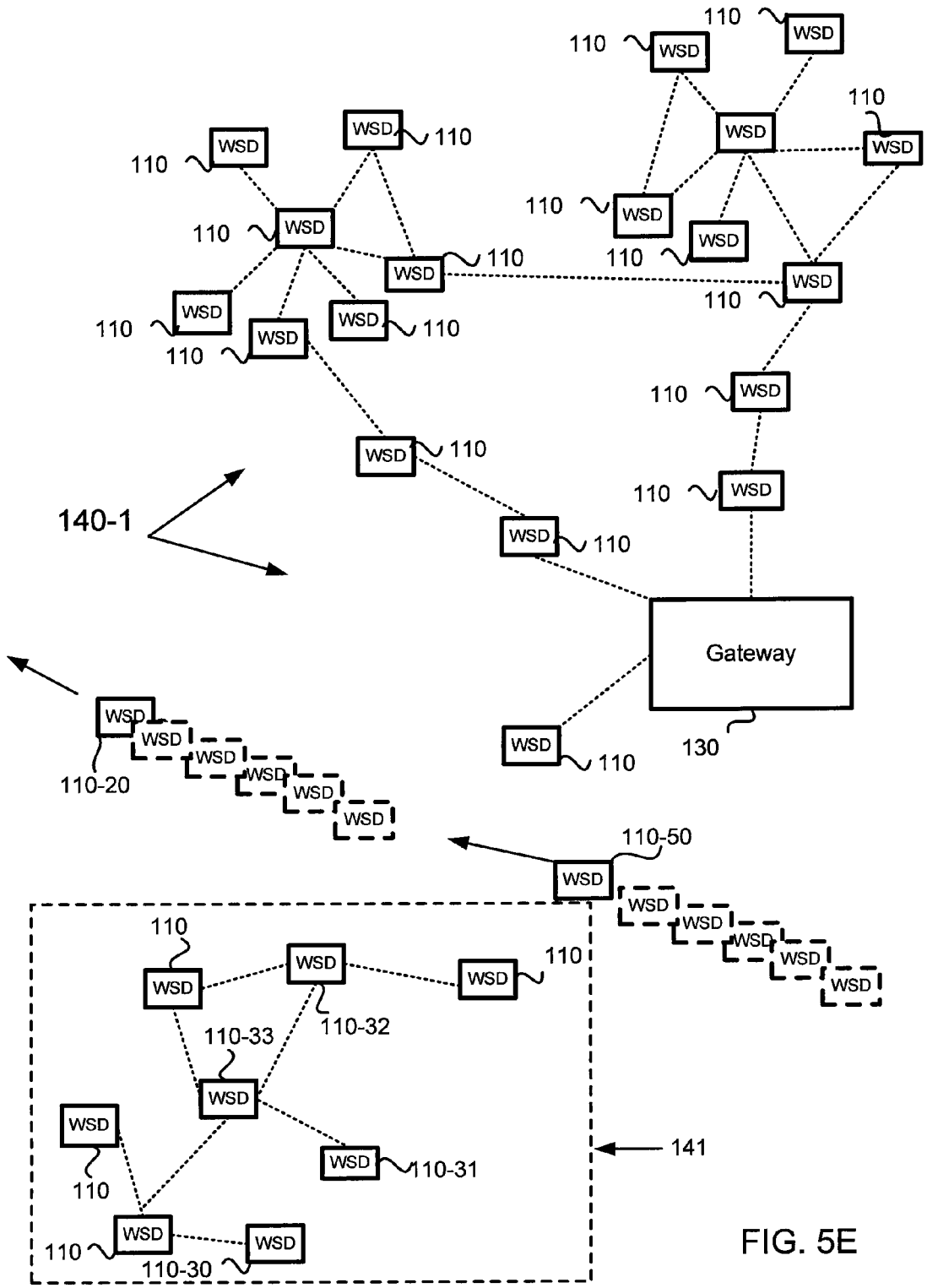
Figure 5F:
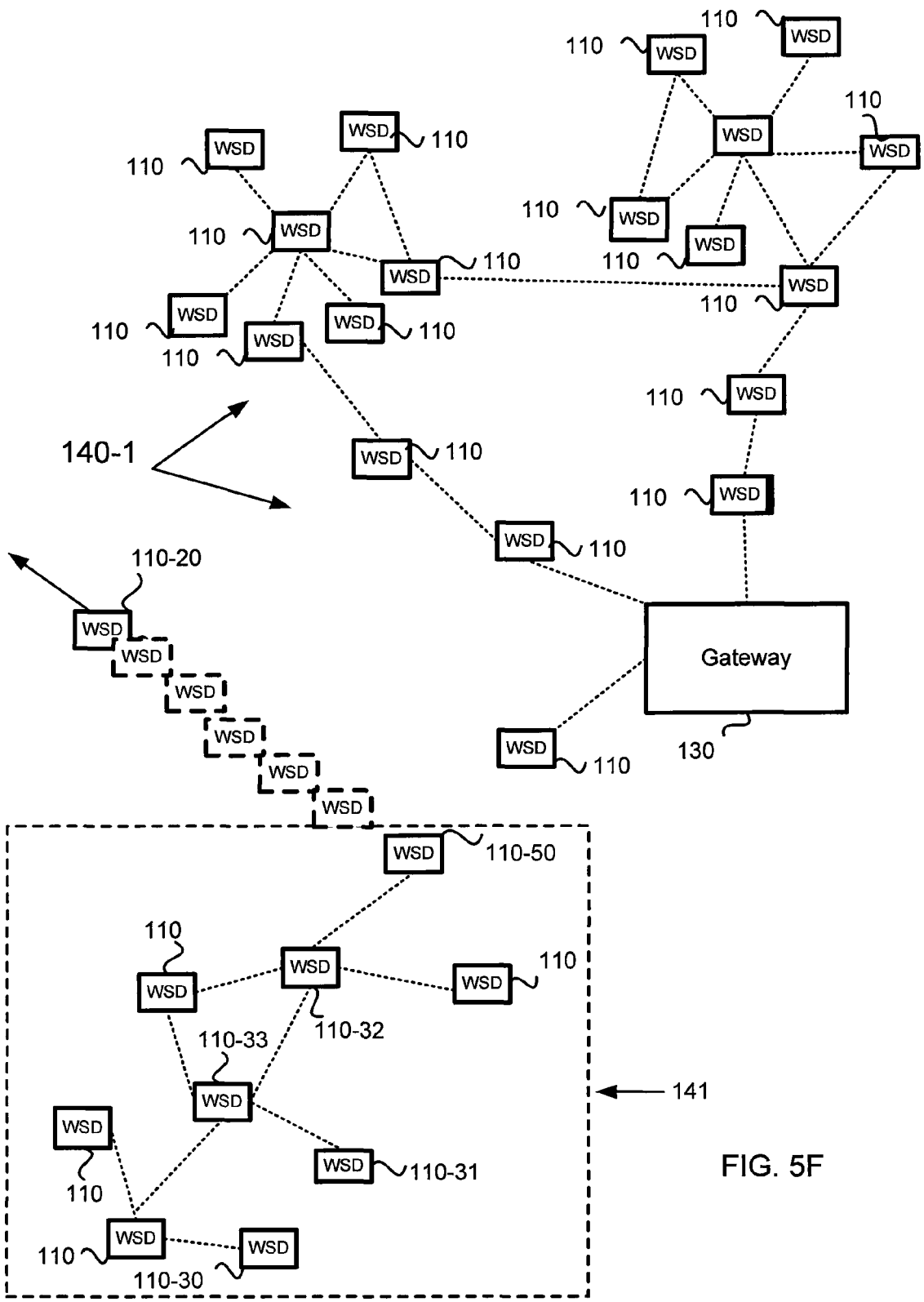
Figure 5G:
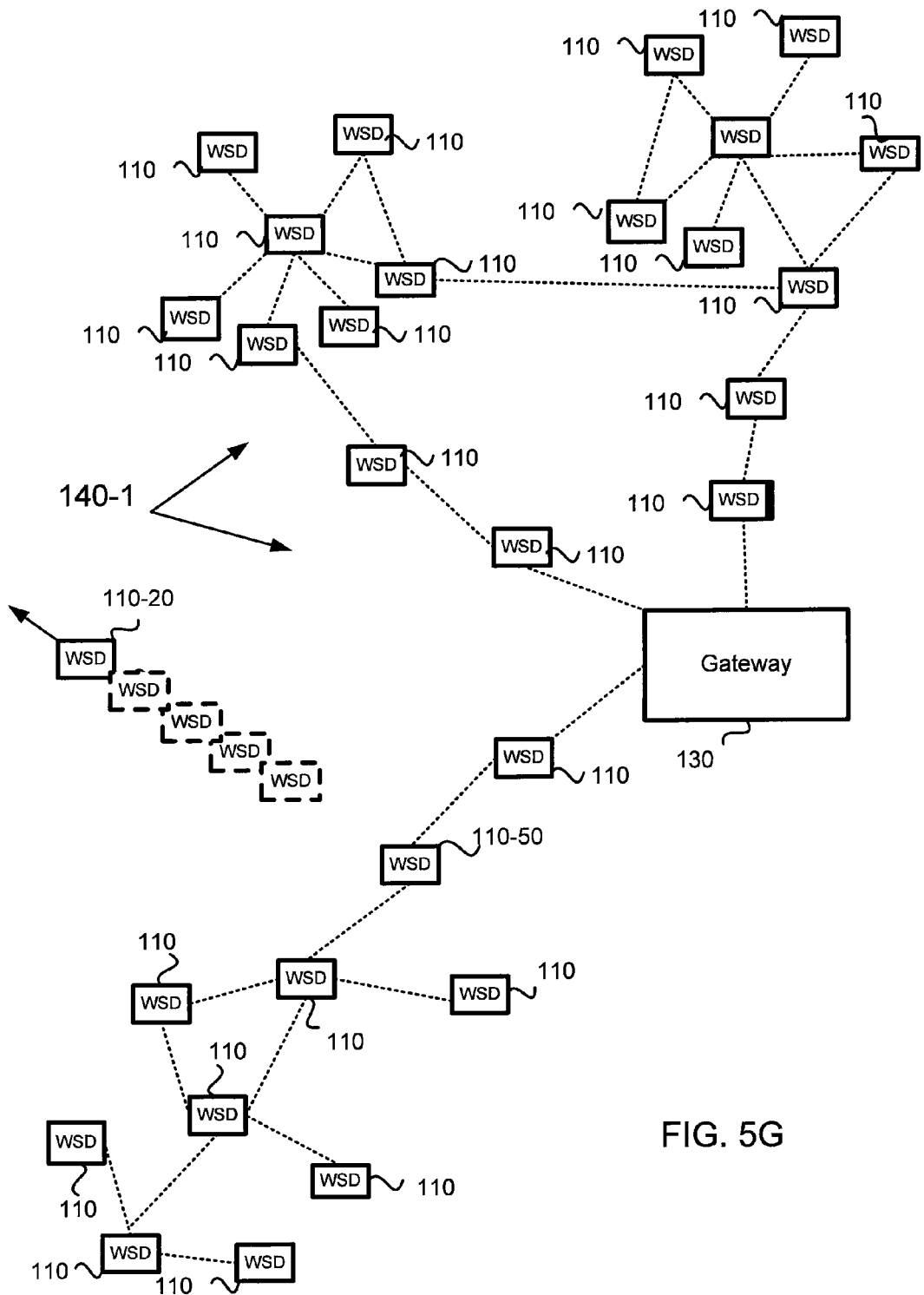
Figure 5H:
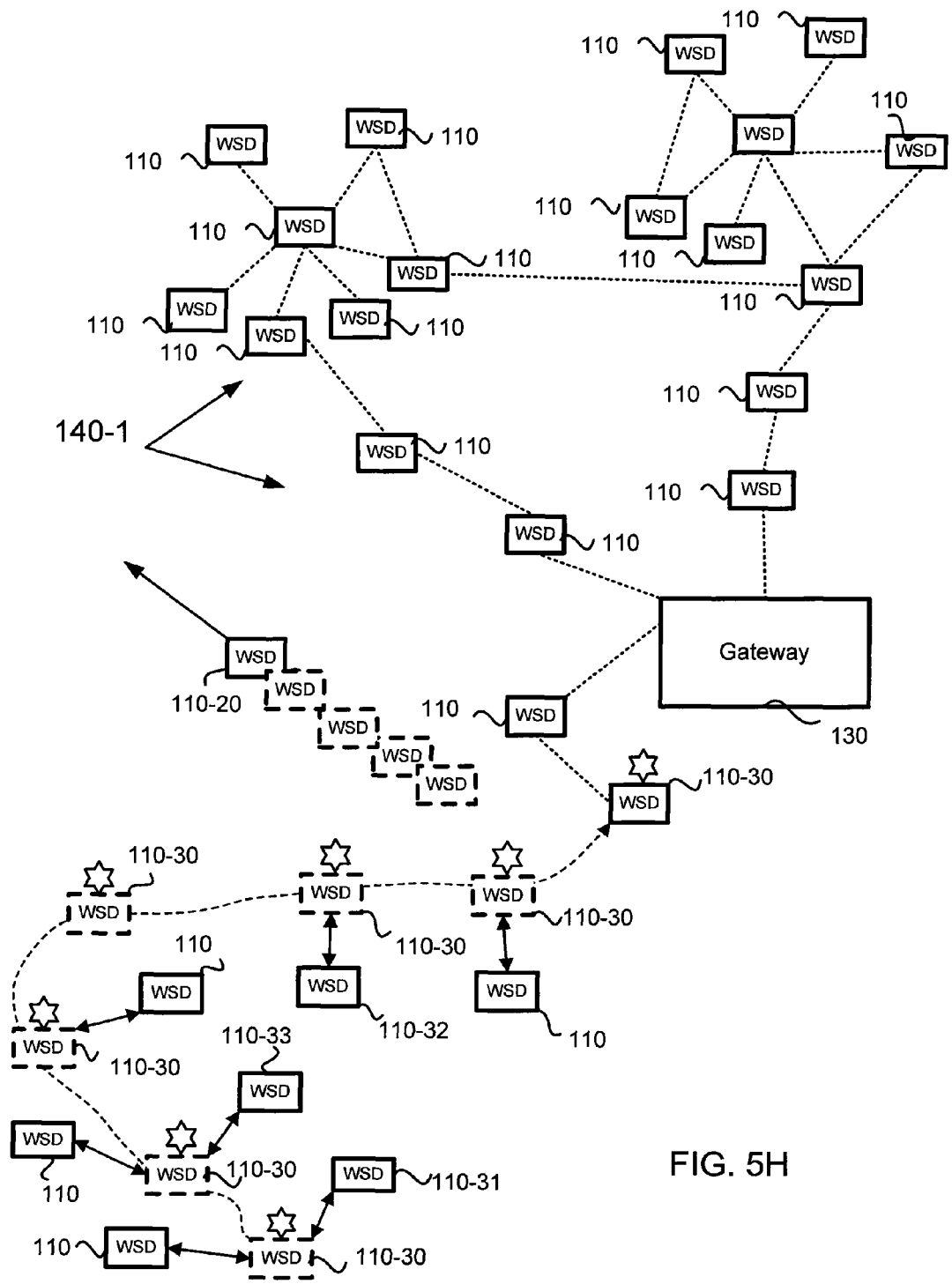

As depicted in FIG. 5C, supplemental networks 141 may begin to form amongst WSDs 110 which have become disconnected from the sensor network 140, and which are located beyond the signaling range of WSDs 110 that remain connected. Each supplemental network 141 is first established when a disconnected WSD 110 establishes a link with another disconnected WSD 110. After this initial supplemental network 141 connection 120 is formed, a supplemental network 141 may expand incrementally to include more and more WSDs 110. This expansion is illustrated in FIGS. 5D and 5E. As the supplemental networks 141 expand, they join together so that supplemental network coverage may include WSDs 110 located near the periphery of the sensor network 140-1.

In such a situation, a remote WSD 110-50 which has not yet joined the supplemental network 141 may be moved to a position between the sensor network 140 and the supplemental network 141. The movement of a remote WSD 110-50 to such a location is depicted in FIGS. 5D and 5E. As shown in FIG. 5E, the position of the remote WSD 110 may be within the signaling range of both a sensor network WSD 110 and a remote WSD 110-32 attached to the supplemental network 141. Thus, this remote WSD may "bridge the gap" between the two networks 140-1, 141 by connecting to both the sensor network 140-1 and the supplemental network 141. In this way, each of the WSDs 110 that was disconnected from the sensor network 140-1 by the original fracture is promptly reconnected once the remote WSD 110-50 establishes a connection with both a sensor network WSD 110 and a supplemental network 141 WSD 110-32.

Although FIGS. 5C-5G show how disconnected WSDs 110 may be quickly reconnected to a sensor network 140 following a network fracture, it should be understood that the same series of events may be used to form a supplemental network 141 amongst WSDs 110 which have not been previously connected to the network. By forming and expanding a supplemental network 141, remote WSDs may accelerate their connection to the sensor network 140 whether or not they have been previously connected to it.

FIG. 5H shows the progression and movement of a WSD 110-30 over a period of time during which it provides courier functionality that enables sensor network 140-1 to obtain status information from remote or disconnected WSDs 110 that are beyond the coverage of the network. As depicted in FIG. 5H, a courier WSD 110-30 (in FIG. 5H, the star above WSD 110-30 indicates that this WSD is providing courier functionality) may be transported to various locations within signaling range of other remote WSDs 110. At each of these locations, the WSD 110-30 may establish a supplemental network 141 with one or more of the remote WSDs 110 in its vicinity. Supplemental networks (indicated by bi-directional arrows) may be created and destroyed as the WSD 110-30 is moved into and then out of the signaling ranges of the various other remote WSDs 110. However, each supplemental network 141 allows the WSD to connect with another WSD and obtain recent status information from it.

FIG. 5H shows that, after obtaining status information from the remote WSDs 110, the movement of the courier WSD 110-30 has brought it within the signaling range of a sensor network WSD. The courier WSD 110-30 connects to the sensor network 140 and provides the status information obtained from the remote WSDs 110 with which it connected using the supplemental networks.

FIG. 6 is a swim lane diagram of operations performed by two WSDs which, at the start of the operations, are remote WSDs that are not connected to any network. As depicted, at 602, a first WSD (depicted on the left side of the swim lane) broadcasts a beacon while not attached to any network. Simultaneously, at 604, a second WSD (depicted on the right side of the swim lane) broadcasts a beacon while not attached to any network. At 606, the second WSD detects the beacon transmitted by the first WSD. At 608, the second WSD transmits a response to the beacon. At 610 and 611, the second WSD and the first WSD perform joining procedures.

Following joining, the second WSD transmits status information to the first WSD, as depicted at 612. At 614, the first WSD receives the status information and queues the information in its null interface queue.

At 616 and 618, the first and second WSD broadcast beacons in order to form additional connections with other WSDS. At 620 and 621, the first and second WSD perform joining procedures with any other WSDs from which a beacon response is received. At 622, the first WSD receives a beacon from a WSD that is attached to the core sensor network 140. At 624, the first WSD 110 transmits a beacon response to the WSD 110 that is attached to the core sensor network 140. At 626, the first WSD performs joining procedures with the WSD 110 that is attached to the core sensor network. At 628, the first WSD forms an upstream interface associated with the WSD 110 to which it connected at 626. At 630, the first WSD also updates its hop count and cost function to reflect the new connection formed at 626.

The first WSD 110 provides its updated hop count and cost function to the second WSD 110, as depicted at 630. The updated hop count and cost function now represent the location of the first WSD 110 in the sensor network 140. In response to the updated information, the second WSD updates its hop count and cost function as depicted at 632. At this point, both the first and second WSD 110 are able to transmit and forward information in the sensor network.

At 634, the new upstream interface at the first WSD becomes the default interface. The first WSD then uses the default interface to transmit the queued status information originally provided by the second WSD. The status information can now be routed to the gateway via network pathways. Finally, as depicted at 636 and 638 the first and second WSDs transmit beacons so as to enlarge the core sensor network to which they are now attached.

Although embodiments herein frequently are disclosed in the context of sensor networks 140, they are not limited to sensor networks, nor are they limited to transportation or logistical applications. Methods and devices disclosed herein can apply to wireless networks communicating information other than sensor information, such as identification, time, security, and/or location information. Indeed, any number of wireless networks can utilize the features disclosed herein for lower power consumption, predictable and consistent power consumption, and other benefits. Along these lines, the WSDs 110 disclosed herein are not limiting. Network devices utilizing the features disclosed herein, for example, may not gather or transmit sensor data.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-readable instructions, which may be used to cause a machine, such as a general-purpose or special-purpose processor or logic circuits programmed with the instructions to perform the methods. These machine-readable instructions may be stored on one or more machine-readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative and presently preferred embodiments of the disclosed systems, methods, and devices have been described in detail herein, it is to be understood that the inventive concepts may be otherwise variously embodied and employed, and that the appended claims are intended to be construed to include such variations, except as limited by the prior art.

The invention claimed is:

1. A method for accelerating expansion of a mesh network formed around a gateway, the method executed at a first wireless device configured to attach to the mesh network, and the method comprising:
    while disconnected from the mesh network, detecting multiple second wireless devices that are configured to attach to the mesh network, wherein detection of the second wireless devices occurs while the second wireless devices are also disconnected from the mesh network;
    while disconnected from the mesh network, forming a preliminary network that includes connections with the second wireless devices and facilitates data sharing with the second wireless devices;
    while disconnected from the mesh network and connected to the preliminary network, detecting a third wireless device that is connected to the mesh network;
    expanding the mesh network by attaching the preliminary network to the mesh network, wherein attaching includes:
        maintaining the connections between the second wireless devices and the first wireless device;
        forming a mesh network connection with the third wireless device, wherein forming the mesh network connection includes obtaining a mesh network cost function that describes routing capabilities of the third wireless device within the mesh network;
    subsequent to attaching the preliminary network to the mesh network, receiving status information from the second wireless devices, wherein the status information is communicated using the connections; and
    forwarding the status information to the gateway via the third wireless device.

2. The method of claim 1, wherein:
    forming the preliminary network includes transmitting information representing a first valued cost function to the second wireless devices; and
    the mesh network is configured to use the first valued cost function to represent routing capabilities of wireless devices connected to the mesh network.

3. The method of claim 2, wherein the first valued cost function is a cost function that is in accordance with a protocol under which the mesh network is operated, and wherein the first valued cost function is a highest valued cost function of all cost functions that are in accordance with the protocol.

4. The method of claim 2, wherein, while connected to the preliminary network before the preliminary network is attached to the mesh network, each of the second wireless devices determines and transmits a respective cost function based on the first valued cost function.

5. The method of claim 4, further comprising:
    upon obtaining the mesh network cost function, generating an updated cost function based on the mesh network cost function, wherein the updated cost function represents routing capabilities of the first wireless device in the mesh network; and
    providing the updated cost function to each of the second wireless devices.

6. The method of claim 5, wherein each of the second wireless devices modifies the respective cost function based on the updated cost function.

7. The method of claim 1, wherein forming the preliminary network and attaching the preliminary network to the mesh network triggers routing of status information to the gateway, the status information transmitted by one of the second wireless devices.

8. The method of claim 1, further comprising:
    determining that the mesh network connection with the third wireless device is severed; broadcasting a beacon, wherein the beacon is detected by wireless devices that are not connected to the mesh network;
    transmitting the first valued cost function to the wireless devices that are not connected to the mesh network; and
    while disconnected from the mesh network, forming another preliminary network including connections with at least two of the wireless devices that are not connected to the mesh network;
    while disconnected from the mesh network and connected to the another preliminary network, detecting a fourth wireless device that is connected to the mesh network; and
    expanding the mesh network by attaching the another preliminary network to the mesh network, wherein attaching includes:
        maintaining the connections included in the another preliminary network; and
        forming a mesh network connection with the fourth wireless device.

9. The method of claim 1, further comprising:
    determining an updated cost function upon receiving the mesh network cost function, the updated cost function representing routing capabilities of the first wireless device in the mesh network;
    transmitting the updated cost function to the second wireless devices, wherein the updated cost function is received at the second wireless devices and, upon being received, causes the second wireless devices to route the status information to the first wireless device.

10. The method of claim 1, further comprising:
    while disconnected from the mesh network but connected to the preliminary network, expanding the preliminary network by attaching another preliminary network to the preliminary network, wherein attaching the another preliminary network includes:
        detecting a fourth wireless device that is connected to the another preliminary network while the another preliminary network is disconnected from the mesh network; and
        forming a connection with the fourth wireless device such that each second wireless device is connected with wireless devices of the another preliminary network by a multi-hop path.

11. An apparatus for accelerating expansion of a mesh network formed around a gateway, the apparatus comprising:
    a processor configured to perform the following operations while the apparatus is disconnected from the mesh network:
        detect multiple second wireless devices configured to attach to the mesh network, wherein detection of the second wireless devices occurs while the second wireless devices are also disconnected from the mesh network;

form a preliminary network that includes connections with the second wireless devices and facilitates data sharing with the second wireless devices; and detect a third wireless device that is connected to the mesh network;

wherein the processor is further configured to:

expand the mesh network by attaching the preliminary network to the mesh network, wherein attaching includes:

maintaining the connections between the second wireless devices; and forming a mesh network connection with the third wireless device, wherein forming the mesh network connection includes obtaining a mesh network cost function that describes routing capabilities of the third wireless device within the mesh network;

subsequent to attaching the preliminary network to the mesh network, receiving status information from the second wireless devices, wherein the status information is communicated using the connections; and forwarding the status information to the gateway via the third wireless device; and a memory coupled to the processor.

12. The apparatus of claim 11, wherein:

forming the preliminary network includes transmitting information representing a first valued cost function to the second wireless devices; and the mesh network is configured to use the first valued cost function to represent routing capabilities of wireless devices connected to the mesh network.

13. The apparatus of claim 12, wherein the first valued cost function is a cost function that is in accordance with a protocol under which the mesh network is operated, and wherein the first valued cost function is a highest valued cost function off all cost functions that are in accordance with the protocol.

14. The apparatus of claim 12, wherein, while connected to the preliminary network before the preliminary network is attached to the mesh network, each of the second wireless devices determines and transmits a respective cost function based on the first valued cost function.

15. The apparatus of claim 14, wherein the processor is further configured to:

generate an updated cost function based on the obtained mesh network cost function, wherein the updated cost function represents routing capabilities of the apparatus in the mesh network; and provide the updated cost function to each of the second wireless devices.

16. The apparatus of claim 15, wherein each of the second wireless devices modifies the respective cost function based on the updated cost function.

17. The apparatus of claim 11, wherein forming the preliminary network and attaching the preliminary network to the mesh network triggers routing of status information to the gateway, the status information transmitted by one of the second wireless devices.

18. The apparatus of claim 11, wherein the processor is further configured to:

determine that the mesh network connection with the third wireless device is severed;

broadcast a beacon, wherein the beacon is detected by wireless devices that are not connected to the mesh network;

transmitting the first valued cost function to the wireless devices that are not connected to the mesh network;

while the apparatus is disconnected from the mesh network, forming another preliminary network including connections with at least two of the wireless devices that are not connected to the mesh network;

while the apparatus is disconnected from the mesh network and connected to the another preliminary network, detect a fourth wireless device that is connected to the mesh network;

expand the mesh network by attaching the another preliminary network to the mesh network, wherein attaching includes:

maintaining the connections included in the another preliminary network; and forming a mesh network connection with the fourth wireless device.

19. The apparatus of claim 11, wherein the processor is further configured to:

determine an updated cost function upon receiving the mesh network cost function, the updated cost function representing routing capabilities of the apparatus in the mesh network; and transmit the updated cost function to the second wireless devices, wherein the updated cost function is received at the second wireless devices and, upon being received, causes the second wireless devices to route the status information to the first wireless device.

20. The apparatus of claim 11, wherein the processor is further configured to perform the following operations while the apparatus is disconnected from the mesh network but connected to the preliminary network:

expand the preliminary network by attaching another preliminary network to the preliminary network, wherein attaching the another preliminary network includes:

detecting a fourth wireless device that is connected to the another preliminary network while the another preliminary network is disconnected from the mesh network; and forming a connection with the fourth wireless device such that each second wireless device is connected with wireless devices of the another preliminary network by a multi-hop path.

* * * * *